United States Patent
Ukai et al.

(10) Patent No.: US 7,906,090 B2
(45) Date of Patent: Mar. 15, 2011

(54) MERCURY REDUCTION SYSTEM AND MERCURY REDUCTION METHOD OF FLUE GAS CONTAINING MERCURY

(75) Inventors: Nobuyuki Ukai, Tokyo (JP); Moritoshi Murakami, Tokyo (JP); Susumu Okino, Tokyo (JP); Tatsuto Nagayasu, Tokyo (JP); Seiji Kagawa, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/640,725

(22) Filed: Dec. 17, 2009

(65) Prior Publication Data

US 2011/0002829 A1    Jan. 6, 2011

Related U.S. Application Data

(60) Provisional application No. 61/223,186, filed on Jul. 6, 2009.

(51) Int. Cl.
*B01D 53/50* (2006.01)
*B01D 53/56* (2006.01)
*B01D 53/64* (2006.01)
*B01D 53/74* (2006.01)

(52) U.S. Cl. .............. 423/210; 423/239.1; 423/243.01; 423/DIG. 5; 422/168; 422/169; 422/170; 422/171; 422/177; 422/180; 422/105; 422/111

(58) Field of Classification Search .................. 423/210, 423/239.1, 243.01, DIG. 5; 422/168, 169, 422/170, 171, 177, 180, 105, 111
See application file for complete search history.

(56) References Cited

U.S. PATENT DOCUMENTS

| 5,900,042 | A | 5/1999 | Mendelsohn et al. |
| 6,638,485 | B1 | 10/2003 | Iida et al. |
| 6,913,737 | B2 | 7/2005 | Honjo et al. |
| 6,960,329 | B2 | 11/2005 | Sellakumar |
| 7,622,092 | B2 * | 11/2009 | Honjo et al. .................. 423/210 |
| 2005/0147549 | A1 | 7/2005 | Lissianski et al. |
| 2007/0202020 | A1 | 8/2007 | Honjo et al. |
| 2010/0183493 | A1 * | 7/2010 | Nochi et al. ............... 423/239.1 |

FOREIGN PATENT DOCUMENTS

| JP | 61-255993 A | 11/1986 |
| JP | 62-44052 A | 3/1987 |
| JP | 10-230137 A | 9/1998 |
| JP | 2001-198434 A | 7/2001 |
| JP | 2007-167743 A | 7/2007 |
| JP | 2008-221087 A | 9/2008 |

OTHER PUBLICATIONS

International Search Report of PCT/JP2009/061029, mailing date of Sep. 15, 2009.

* cited by examiner

*Primary Examiner* — Timothy C Vanoy
(74) *Attorney, Agent, or Firm* — Westerman, Hattori, Daniels & Adrian, LLP

(57) ABSTRACT

A mercury reduction system according to the present embodiment is a mercury reduction system that reduces NOx and Hg in flue gas discharged from a boiler, and includes an $NH_4Cl$ solution spraying unit that sprays an $NH_4Cl$ solution into a flue of the boiler in a liquid state, a mixed gas spraying unit that is provided downstream of the $NH_4Cl$ solution spraying unit and sprays mixed gas containing $NH_3$ gas and HCl gas into the flue, a reduction denitration apparatus that includes a denitration catalyst reducing NOx in the flue gas with $NH_3$ and oxidizing Hg in the presence of HCl, and a wet desulfurization apparatus that reduces Hg oxidized in the reduction denitration apparatus with a limestone-gypsum slurry.

22 Claims, 15 Drawing Sheets

MERCURY REDUCTION SYSTEM AND MERCURY REDUCTION METHOD OF FLUE GAS CONTAINING MERCURY

CROSS-REFERENCE TO RELATED APPLICATIONS

This patent document claims the benefit of priority to U.S. Provisional Patent Application Ser. No. 61/223,186, filed on Jul. 6, 2009, which is herein incorporated by reference.

BACKGROUND OF THE INVENTION

1. Field of the Invention

The present invention relates to a mercury reduction system and a mercury reduction method of flue gas containing mercury that reduces mercury in flue gas discharged from a boiler or the like.

2. Description of the Related Art

In coal-fired flue gas and flue gas generated by burning heavy fuel oil may contain dust, sulfur oxide (SOx), and nitrogen oxide (NOx), as well as metallic mercury ($Hg^0$). In recent years, various proposals have been made on methods and apparatuses for treating the metallic mercury, in combination with a denitration apparatus that reduces NOx and a wet desulfurization apparatus that uses an alkali absorbent as a SOx absorbent.

As a method for treating metallic mercury in flue gas, a system in which reduction denitration is carried out by spraying ammonium ($NH_3$) into a flue in the upstream process of a high-temperature denitration apparatus, and oxidizing (chlorinating) mercury on a denitration catalyst to be aqueous hydrogen chloride, by spraying a chlorinating agent such as hydrochloric acid (HCl), and then reducing mercury by a wet desulfurization apparatus installed in the downstream side has been proposed (for example, see Patent Document 1).

FIG. 15 is a schematic of a flue gas treatment system including a mercury reduction system. As shown in FIG. 15, in a flue gas treatment system 100 including the mercury reduction system, a boiler 101 discharges flue gas 102 containing nitrogen oxide and mercury, and supplies to a reduction denitration apparatus 103, where nitrogen oxide is reduced. The heat of the flue gas 102 is exchanged with air by an air heater 104, and the flue gas 102 is supplied to a dust collector 106, after the heat is collected by a heat collector 105. A desulfurization apparatus 107 reduces sulfur oxide in the flue gas 102, and discharges as purified gas 108. The gas is then heated by a reheater 109 and discharged from a stack 110.

An $NH_3$ injection spot 111 is provided upstream of the reduction denitration apparatus 103, and nitrogen oxide is reduced by $NH_3$ supplied from an $NH_3$ tank 112.

A hydrogen chloride concentration measuring unit 113 installed upstream of the desulfurization apparatus 107 in the flue measures the concentration of hydrogen chloride used as a mercury chlorinating agent, and a mercury concentration measuring unit 114 installed downstream of the desulfurization apparatus 107 measures the concentration of mercury. Based on the measured concentration values of hydrogen chloride and mercury, an operating unit 117 calculates the supply of an aqueous hydrogen chloride (HCl) solution 116 supplied from a hydrochloric acid solution tank 115. A controlling unit 118 controls the supply of evaporated hydrochloric acid (HCl gas) supplied into a flue 120 from an HCl injection spot 119 from the hydrochloric acid solution tank 115.

$NH_3$, urea (($NH_2$)$_2$CO), and the like are supplied as a reducing agent and HCl is supplied as a mercury chlorinating agent. Accordingly, on a denitration catalyst filled into the reduction denitration apparatus 103, $NH_3$ promotes the reduction reaction of nitrogen oxide NOx in the flue gas 102 as the following formula (1), and HCl promotes the oxidation reaction of Hg as the following formula (2).

$$4NO+4NH_3+O_2 \; 4N_2+6H_2O \tag{1}$$

$$Hg+\tfrac{1}{2}O_2+2HCl \; HgCl_2+H_2O \tag{2}$$

In the conventional method, the reducing agent and the mercury chlorinating agent are not only supplied in a gaseous state as $NH_3$ gas and HCl gas, but also supplied in a liquid state as an $NH_4Cl$ solution. When the agents are supplied in a liquid state as $NH_4Cl$ solution, $NH_4Cl$ is dissociated into $NH_3$ gas and HCl gas. Accordingly, $NH_3$ gas acts as a reducing agent and HCl gas acts as a mercury chlorinating agent.

Patent Document 1: Japanese Patent Application Laid-open No. 10-230137

However, if the reducing agent and the mercury chlorinating agent are supplied in a gaseous state as $NH_3$ gas and HCl gas, there poses a problem that gas supply equipment such as a spraying nozzle is separately required for two systems.

When the reducing agent and the mercury chlorinating agent are supplied in a liquid state as $NH_4Cl$ solution, if $NH_4Cl$ is dissociated, $NH_3$ gas and HCl gas generated from 1 mol of $NH_4Cl$ are 1 mol each. Accordingly, the generating amount of $NH_3$ gas and HCl gas cannot be controlled. Consequently, if the required ratio of $NH_3$ and HCl is not one-to-one, due to the gaseous nature of NOx and metallic mercury $Hg^0$ in the flue gas, there poses a problem that at least one of $NH_3$ or HCl may exceed or fall short.

When $NH_4Cl$ solution is sprayed into the flue, low-temperature droplets collide with structures such as a duct wall and a support member (beam) in the flue. Accordingly, the thermal strain is caused by thermal shock, and may damage the structures. Consequently, a spraying nozzle needs to be installed, so that the liquid droplets of the $NH_4Cl$ solution do not collide with the structures before evaporating. In this case, as shown in FIG. 16, for example, a duct is divided into a high concentration region A where the concentrations of $NH_4Cl$ solution, $NH_3$ gas, and HCl gas are high, and a low concentration region B where the concentrations of $NH_4Cl$ solution, $NH_3$ gas, and HCl gas are low, near the structure such as a duct wall. Consequently, there is a problem that the concentrations of $NH_4Cl$ solution, $NH_3$ gas, and HCl gas near the structure such as the duct wall, become low.

The present invention is made in view of the foregoing, and has an object to provide a mercury reduction system and a mercury reduction method of flue gas containing mercury that can simultaneously and uniformly supply a reducing agent and a mercury chlorinating agent in any proportion with a simple device.

SUMMARY OF THE INVENTION

According to an aspect of the present invention, a mercury reduction system that reduces nitrogen oxide and mercury in flue gas discharged from a boiler includes: a liquid material spraying unit that sprays a liquid material obtained by dissolving an oxidation-reduction agent reducing nitrogen oxide in the flue gas by a denitration catalyst and oxidizing mercury in a presence of hydrogen chloride, into a flue of the boiler in a liquid state; a gaseous material spraying unit that is provided downstream of the liquid material spraying unit, and sprays at least one of a reducing agent reducing nitrogen oxide in the flue gas by the denitration catalyst and a mercury chlorinating agent oxidizing mercury in the flue gas in the presence of the hydrogen chloride by the denitration catalyst or both of them into the flue as a gaseous material; a reduction denitration apparatus that includes the denitration catalyst reducing nitrogen oxide in the flue gas with ammonia, and oxidizing mercury in the presence of the hydrogen chloride; and a wet desulfurization apparatus that reduces mercury having been oxidized by the reduction denitration apparatus with an alkali absorbent.

Advantageously, in the mercury reduction system, the liquid material is a mixed solution obtained by mixing at least one of the reducing agent that reduces nitrogen oxide in the flue gas by the denitration catalyst and the mercury chlorinating agent that oxidizes mercury in the presence of the hydrogen chloride or both of them with the oxidation-reduction agent.

Advantageously, in the mercury reduction system, the oxidation-reduction agent is an ammonium halide.

Advantageously, in the mercury reduction system, the liquid material used as the reducing agent is at least one of ammonia and urea or both of them.

Advantageously, in the mercury reduction system, the liquid material used as the mercury chlorinating agent is a hydrogen halide.

Advantageously, in the mercury reduction system, the liquid material spraying unit includes an oxidation-reduction agent feed pipe through which the oxidation-reduction agent is supplied into the flue in a liquid state; a blow pipe with an injection hole that is inserted into the flue so as to surround the oxidation-reduction agent feed pipe, and through which air supplied therein is injected into the flue; and an injection nozzle that is fitted to an end of the oxidation-reduction agent feed pipe, and through which the oxidation-reduction agent is injected, and the oxidation-reduction agent is sprayed into the flue accompanied with the air.

Advantageously, in the mercury reduction system, the injection nozzle is a two-fluid nozzle through which the oxidation-reduction agent and the air for spraying the oxidation-reduction agent are injected.

Advantageously, in the mercury reduction system, the liquid material spraying unit includes an oxidation-reduction agent feed pipe through which the oxidation-reduction agent is supplied into the flue in a liquid state, an air feed-pipe that is inserted into the flue so as to surround the oxidation-reduction agent feed pipe, and through which air for spraying the oxidation-reduction agent is supplied into the flue, and a two-fluid nozzle that is fixed to an end of the oxidation-reduction agent feed pipe and of the air feed pipe, and through which the oxidation-reduction agent and the air are injected, and the oxidation-reduction agent is sprayed into the flue accompanied with the air.

Advantageously, the mercury reduction system further includes a vaporizer that is provided outside of the flue, and supplies the liquid material sprayed from the liquid material spraying unit and the gaseous material injected from the gaseous material spraying unit to high-temperature air supplied into an apparatus main body, and supplies the high-temperature air containing the liquid material and the gaseous material into the flue.

Advantageously, the mercury reduction system further includes a high-temperature air introduction pipe that is inserted into the flue from the apparatus main body, and introduces the high-temperature air containing the liquid material and mixed gas in the apparatus main body into the flue. The high-temperature air introduction pipe has a plurality of short pipes with holes in a longitudinal direction thereof.

Advantageously, in the mercury reduction system, the gaseous material used as the reducing agent is ammonia.

Advantageously, in the mercury reduction system, the gaseous material used as the mercury chlorinating agent is a hydrogen halide.

Advantageously, in the mercury reduction system, temperature of the flue gas is equal to or more than 320° C. and equal to or less than 420° C.

Advantageously, the mercury reduction system further includes a nitrogen oxide concentration meter that is provided upstream and downstream of the reduction denitration apparatus, and measures concentration of nitrogen oxide in the flue gas.

According to another aspect of the present invention, a mercury reduction method of flue gas containing mercury for reducing nitrogen oxide and mercury in flue gas discharged from a boiler, includes: a step of liquid material spraying for spraying a liquid material obtained by dissolving an oxidation-reduction agent that reduces nitrogen oxide in the flue gas by a denitration catalyst and oxidizes mercury in a presence of hydrogen chloride with a solvent, into a flue of the boiler in a liquid state; a step of gaseous material spraying for spraying at least one of a reducing agent that reduces nitrogen oxide in the flue gas by the denitration catalyst and a mercury chlorinating agent that oxidizes mercury in the flue gas in the presence of the hydrogen chloride by the denitration catalyst or both of them into the flue as a gaseous material; a step of reduction denitration treating for reducing nitrogen oxide in the flue gas by the denitration catalyst with ammonia and oxidizing mercury in the presence of the hydrogen chloride; and a step of wet desulfurizing for reducing mercury oxidized at the step of reduction denitration treating by with an alkali absorbent.

Advantageously, in the mercury reduction method of flue gas containing mercury, the liquid material is a mixed solution obtained by mixing at least one of the reducing agent that reduces nitrogen oxide in the flue gas by the denitration catalyst and the mercury chlorinating agent that oxidizes mercury in the presence of the hydrogen chloride or both of them with the oxidation-reduction agent.

Advantageously, in the mercury reduction method of flue gas containing mercury, the oxidation-reduction agent is an ammonium halide.

Advantageously, in the mercury reduction method of flue gas containing mercury, the liquid material used as the reducing agent is ammonia or urea.

Advantageously, in the mercury reduction method of flue gas containing mercury, the liquid material used as the mercury chlorinating agent is a hydrogen halide.

Advantageously, in the mercury reduction method of flue gas containing mercury, the liquid material is sprayed with a two-fluid nozzle at the step of liquid material spraying.

Advantageously, in the mercury reduction method of flue gas containing mercury, the gaseous material used as the reducing agent is ammonia.

Advantageously, in the mercury reduction method of flue gas containing mercury, the gaseous material used as the mercury chlorinating agent is a hydrogen halide.

DETAILED DESCRIPTION OF THE INVENTION

Exemplary embodiments of the present invention will be described in detail with reference to the accompanying drawings. However, the present invention is not limited by the embodiments. Constituting elements in the embodiments include elements that can be easily achieved by a person skilled in the art, or elements being substantially the same as those elements.

First Embodiment

A mercury reduction system according to a first embodiment of the present invention will be described with reference to the accompanying drawings.

Figure 1:
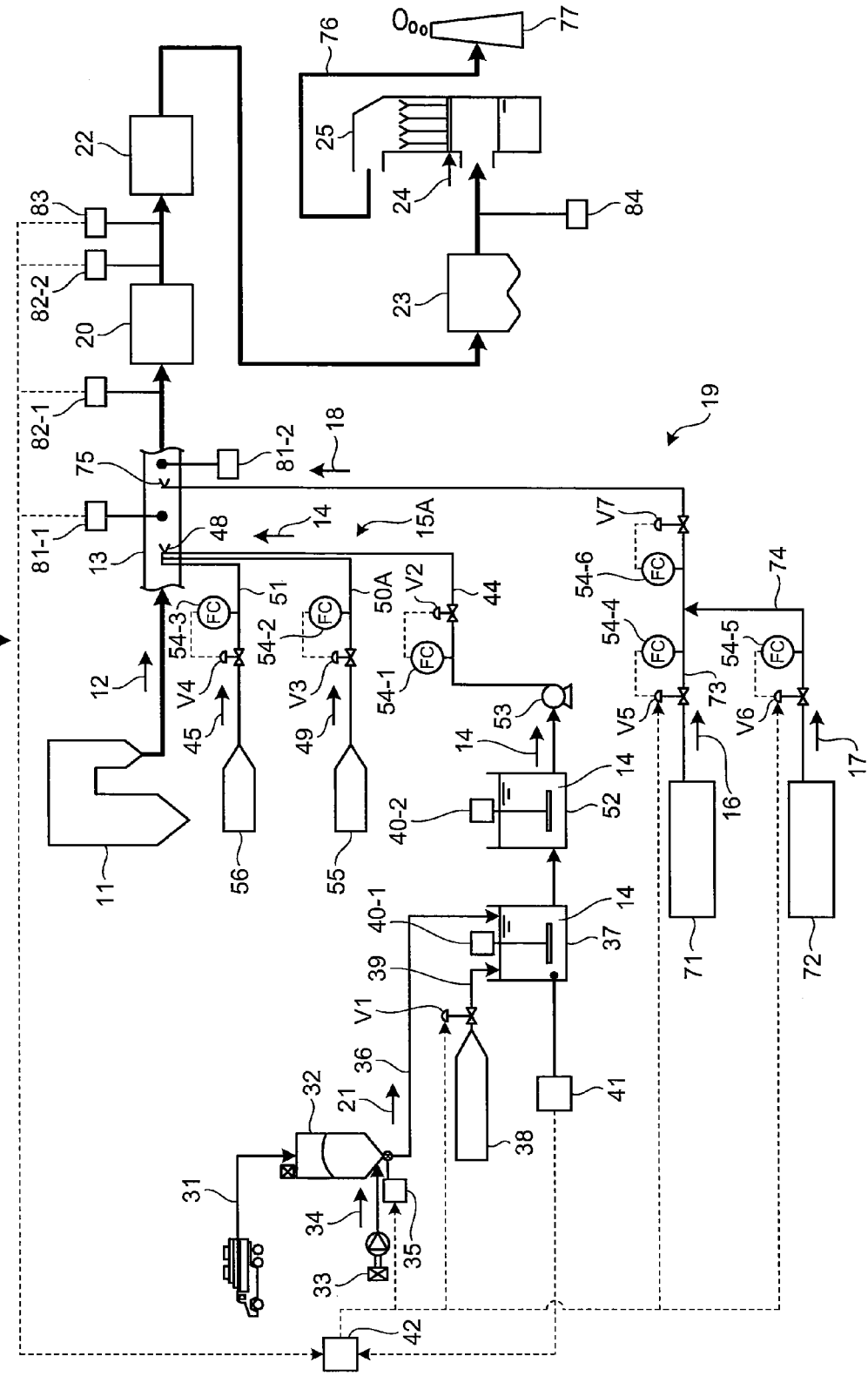
FIG. 1 is a schematic of a mercury reduction system according to a first embodiment of the present invention.
Figure 2:
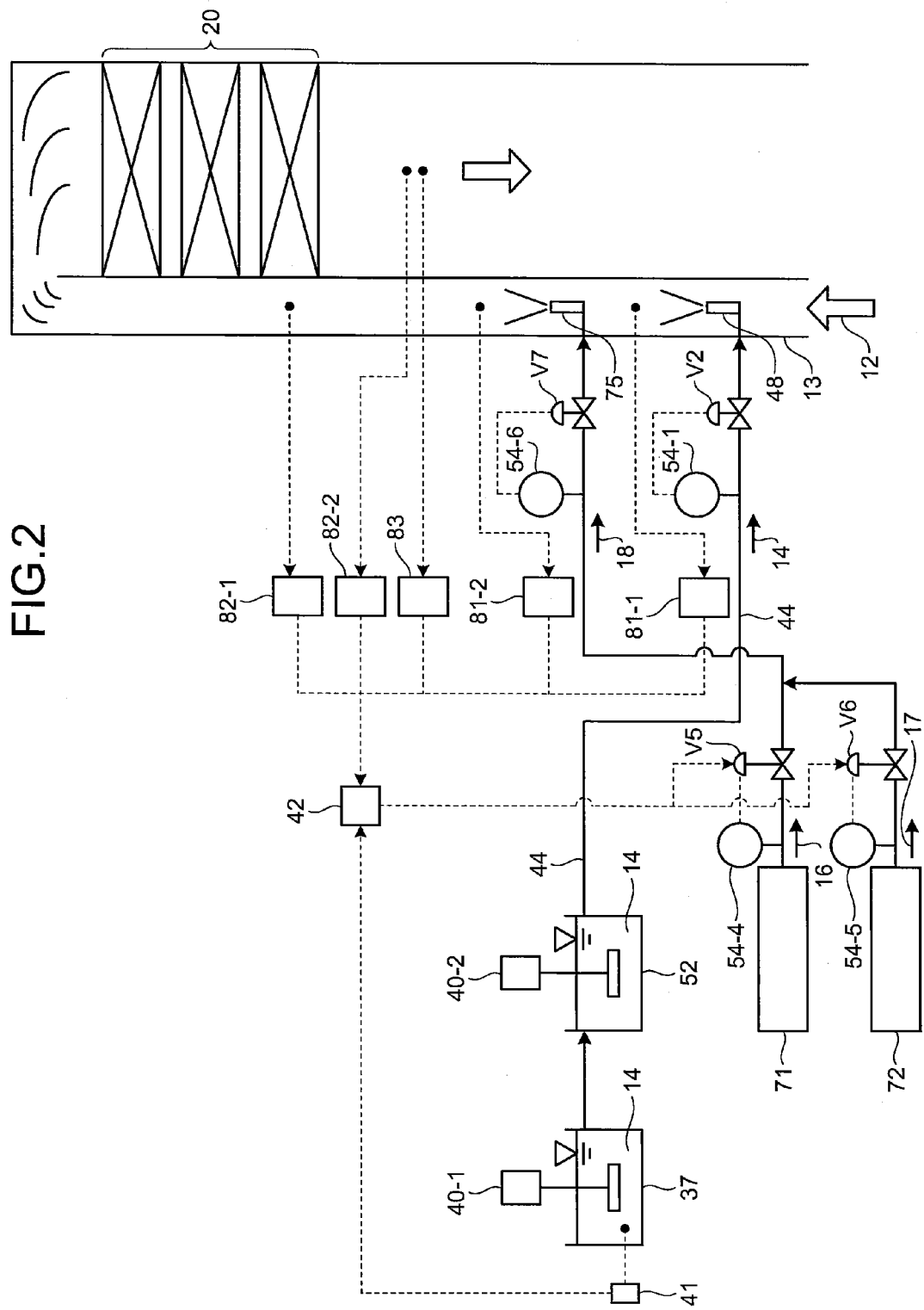
FIG. 2 is a schematic of a part of the structure of the mercury reduction system.

FIG. 1 is a schematic of the mercury reduction system according to the first embodiment of the present invention. FIG. 2 is a schematic of a part of the structure of the mercury reduction system.

As shown in FIGS. 1 and 2, a mercury reduction system 10A according to the present embodiment is a mercury reduction system that reduces nitrogen oxide (NOx) and mercury (Hg) in flue gas 12 discharged from a boiler 11. The mercury reduction system 10A includes an $NH_4Cl$ solution spraying unit (liquid material spraying unit) 15A that sprays ammonium chloride ($NH_4Cl$) solution 14 obtained by dissolving ammonium chloride ($NH_4Cl$) used as an oxidation-reduction agent for reducing NOx in the flue gas 12 by a denitration catalyst and oxidizing Hg in the presence of hydrogen chloride, into a flue 13 downstream of the boiler 11 in a liquid state. The mercury reduction system 10A also includes a mixed gas spraying unit (gaseous material spraying unit) 19 that is arranged downstream of the liquid material spraying unit 15A, and sprays mixed gas 18 containing $NH_3$ gas 16 used as a reducing agent for reducing NOx in the flue gas 12 by the denitration catalyst and hydrogen chloride (HCl) gas 17 used as a mercury chlorinating agent for oxidizing Hg in the flue gas 12 in the presence of HCl by the denitration catalyst, into the flue 13 as a gaseous material. The mercury reduction system 10A also includes a reduction denitration apparatus 20 that has a denitration catalyst for reducing NOx in the flue gas 12 with $NH_3$ and oxidizing Hg in the presence of HCl, an air heater (APH) 22 that heat exchanges the denitrated flue gas 12, a dust collector 23 that reduces dust in the denitrated flue gas 12, and a wet desulfurization apparatus 25 that reduces Hg oxidized in the reduction denitration apparatus 20 with a limestone-gypsum slurry 24 as an alkali absorbent.

In the present invention, the oxidation-reduction agent functions as an oxidation agent used to oxidize and chlorinate mercury (Hg) in the presence of hydrogen chloride (HCl) by the denitration catalyst, and a reducing agent used to reduce ammonia ($NH_3$).

<$NH_4Cl$ Solution Spraying Unit>
(Adjusting $NH_4Cl$ Solution)

The $NH_4Cl$ solution 14 is adjusted to a predetermined concentration. Ammonium chloride ($NH_4Cl$) powder 31 is conveyed and supplied to a silo 32 in which the $NH_4Cl$ powder is temporarily retained. A blower 33 supplies air 34 to the $NH_4Cl$ powder 31 in the silo 32 and prevents the $NH_4Cl$ powder 31 from drying and fixed in the silo 32. A predetermined amount of the $NH_4Cl$ powder 31 in the silo 32 is supplied to an $NH_4Cl$ powder feed path 36 from the silo 32 by a feeder 35 and fed into an $NH_4Cl$ dissolving tank 37. A water supplying tank 38 feeds water 39 into the $NH_4Cl$ dissolving tank 37. The $NH_4Cl$ dissolving tank 37 includes a stirring unit 40-1, and the $NH_4Cl$ powder 31 supplied into the $NH_4Cl$ dissolving tank 37 is dissolved in the water 39, thereby generating $NH_4Cl$ solution 14 of a predetermined concentration. The stirring unit 40-1 keeps the concentration of the $NH_4Cl$ solution 14 constant. The amount of water 39 supplied from the water supplying tank 38 is adjusted with a valve V1.

Figure 3:
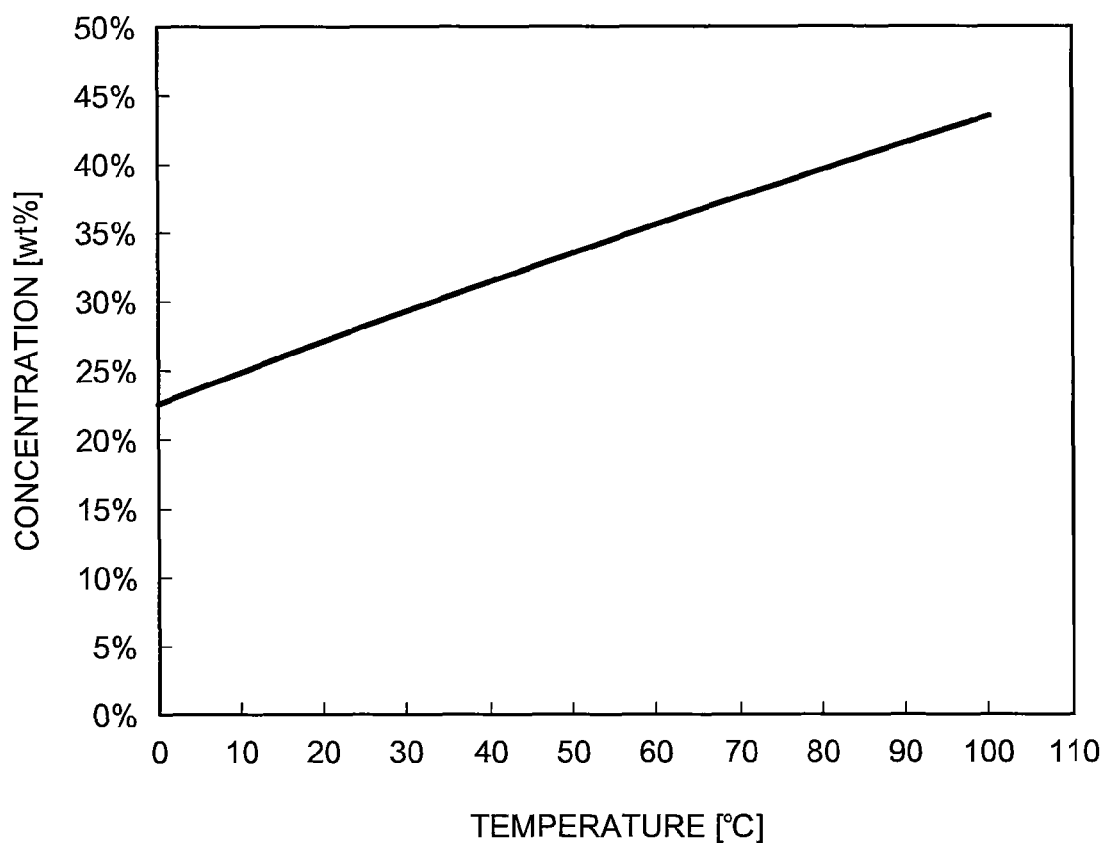
FIG. 3 is a schematic of relationship between the temperature of $NH_4Cl$ and the saturation concentration in water.

The concentration of the $NH_4Cl$ solution 14 is preferably more than 0 wt % and equal to or less than 43 wt %, more preferably equal to or more than 10 wt % and equal to or less than 23 wt %, more preferably equal to or more than 18 wt % and equal to or less than 23 wt %, and most preferably about 20 wt %. This is because, the $NH_4Cl$ powder 31 needs to be dissolved in the water 39 at least at room temperature (for example, at around 20° C.), and the concentration of the $NH_4Cl$ solution 14 should be equal to or less than saturation concentration of $NH_4Cl$ in water. FIG. 3 is a schematic of the relationship between the temperature of $NH_4Cl$ and the saturation concentration in water. As shown in FIG. 3, if the temperature of the solution is about 0° C., the saturation concentration of the $NH_4Cl$ powder 31 dissolved in the water 39 is about 23 wt (, and if the temperature is about 100° C., the saturation concentration of the $NH_4Cl$ powder 31 dissolved in the water 39 is about 43 wt %. Accordingly, the concentration of the $NH_4Cl$ solution 14 needs to be more than 0 wt % and equal to or less than 43 wt %.

(Controlling the Concentration of $NH_4Cl$ Solution)

The $NH_4Cl$ solution 14 in the $NH_4Cl$ dissolving tank 37 is measured by an ammonium chloride ($NH_4Cl$) concentration meter 41 and the measured concentration value of the $NH_4Cl$ solution 14 is transmitted to an arithmetic apparatus 42. The arithmetic apparatus 42 determines the supplies of the $NH_4Cl$ powder 31 and the water 39, based on the concentration of the $NH_4Cl$ solution 14. The arithmetic apparatus 42 transmits control signals to the feeder 35 and the valve V1, and adjusts the supplies of the $NH_4Cl$ powder 31 and the water 39. The concentration of the $NH_4Cl$ solution 14 in the $NH_4Cl$ dissolving tank 37 is adjusted so as to fall within a range more than 0 wt % and equal to or less than 43 wt %.

In the mercury reduction system 10A according to the present embodiment, the $NH_4Cl$ solution spraying unit 15A includes an $NH_4Cl$ solution feed pipe 44 for supplying the $NH_4Cl$ solution 14 into the flue 13 in a liquid state, a blow pipe 47 (see FIGS. 4 and 5) that is inserted into the flue 13 so as to surround the $NH_4Cl$ solution feed pipe 44 and has an injection hole 46 (see FIG. 5) from which air 45 supplied inside is injected into the flue 13, and a two-fluid nozzle 48 that is attached to an end of the $NH_4Cl$ solution feed pipe 44 and injects the $NH_4Cl$ solution 14. The $NH_4Cl$ solution spraying unit 15A includes an air feed pipe 50A connected to the two-fluid nozzle 48 for supplying air 49 used for compressing and spraying the $NH_4Cl$ solution 14, and an air feed pipe 51 connected to the blow pipe 47 (see FIG. 4) for supplying the air 45 used for compressing and spraying the $NH_4Cl$ solution 14 into the blow pipe 47. In FIG. 1, the air feed pipe 51 is inserted into the flue 13. However, the air feed pipe 51 is connected to the blow pipe 47 (see FIG. 4).

Figure 4:
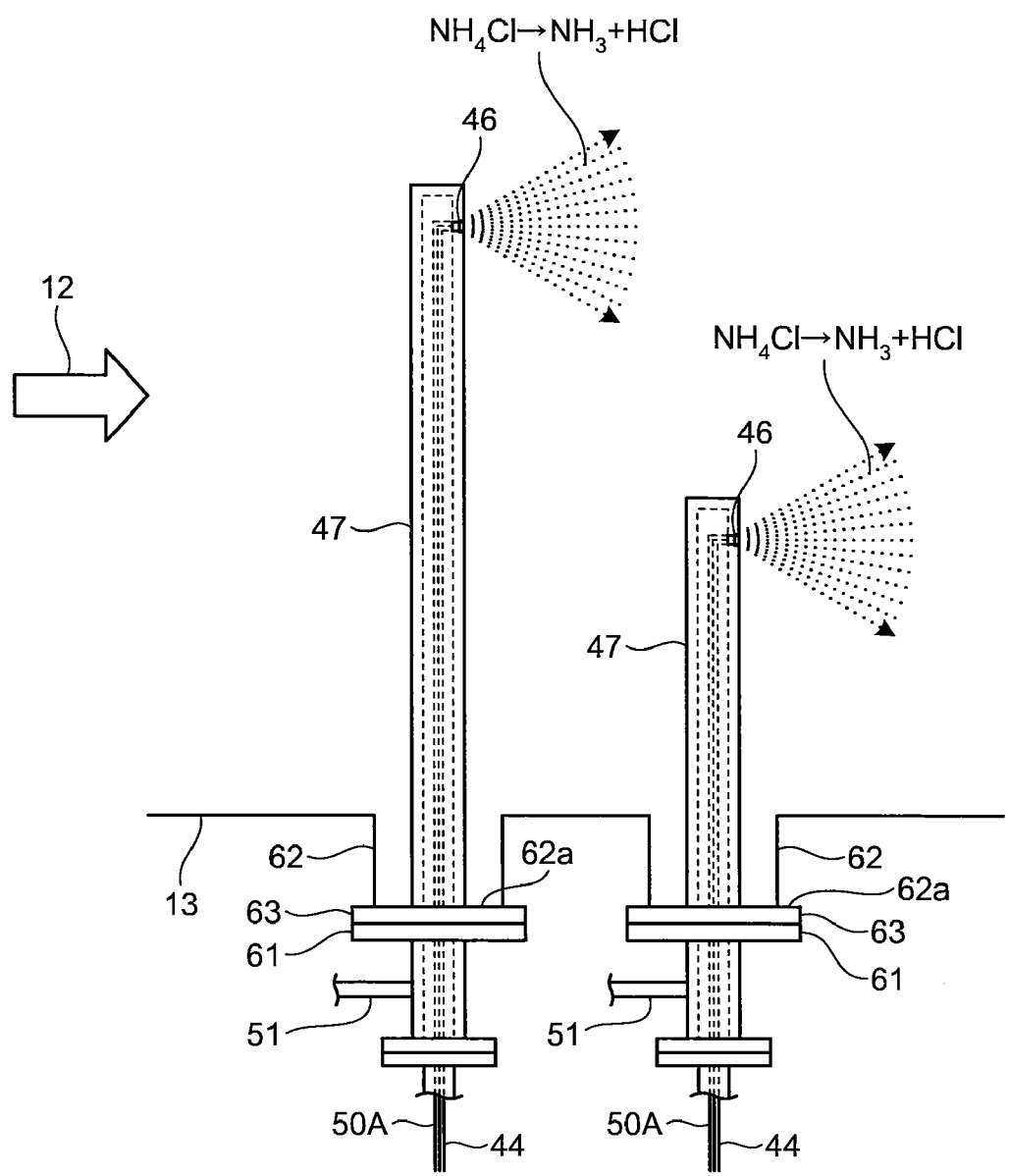
FIG. 4 is a schematic of flues in which an $NH_4Cl$ solution feed pipe and an air feed pipe are inserted and near the flues.
Figure 5:
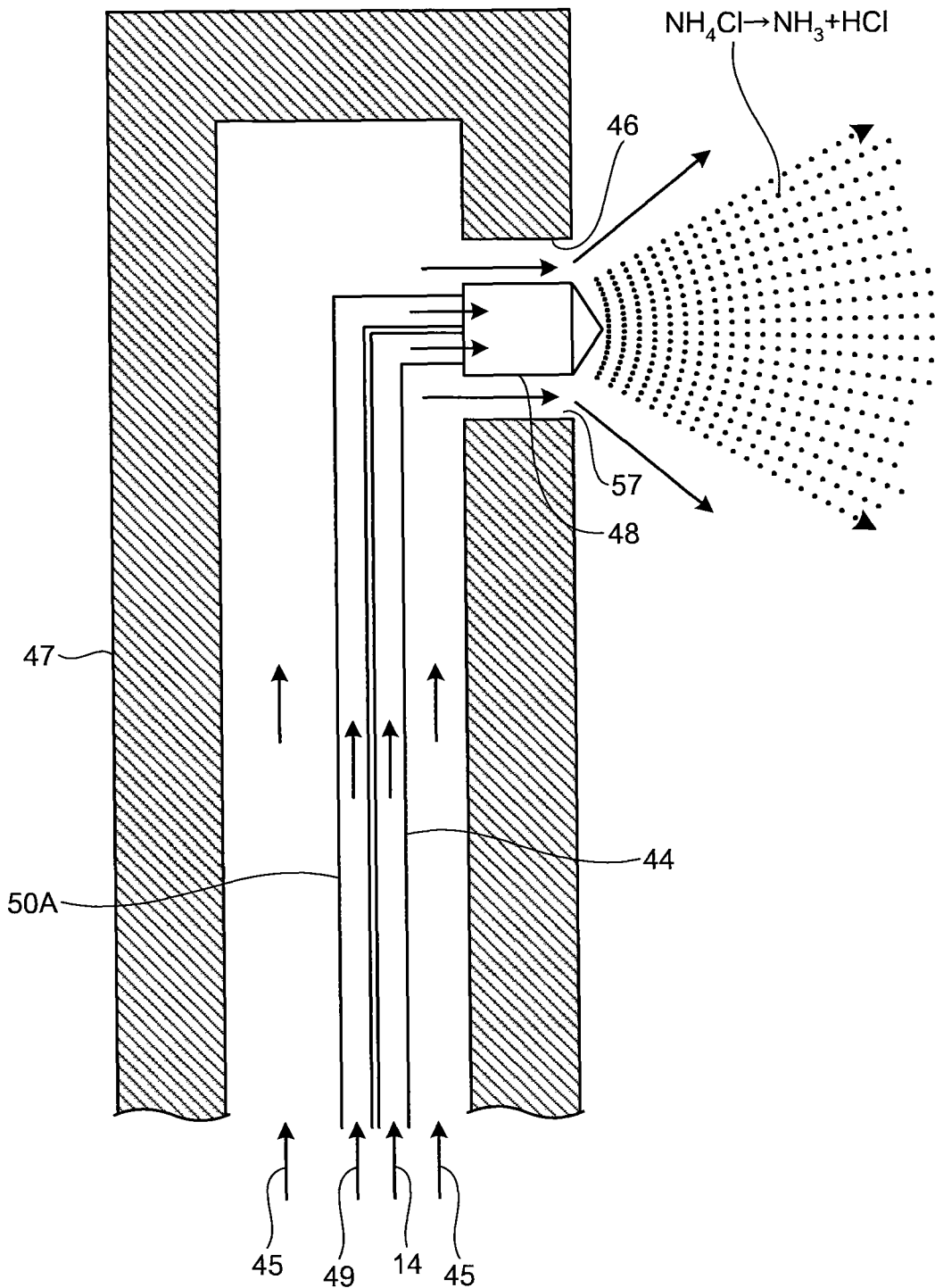
FIG. 5 is a partially enlarged sectional view of FIG. 4.

FIG. 4 is a schematic of flues in which the $NH_4Cl$ solution feed pipe and the air feed pipe are inserted and near the flues. FIG. 5 is a partially enlarged sectional view of FIG. 4. As shown in FIG. 4, the blow pipe 47 is inserted into the flue 13 so as to surround the $NH_4Cl$ solution feed pipe 44 and the air feed pipe 50A. As shown in FIG. 5, the $NH_4Cl$ solution feed pipe 44 is provided so as to be adjacent to the air feed pipe 50A in the blow pipe 47. The two-fluid nozzle 48 is provided in the injection hole 46 at the wall surface of the blow pipe 47, and connected to the $NH_4Cl$ solution feed pipe 44 and the air feed pipe 50A. The $NH_4Cl$ solution 14 injected from the two-fluid nozzle 48 is sprayed by the air 49, and the $NH_4Cl$ solution 14 is further sprayed into the flue 13, accompanied with the air 45 injected from the injection hole 46.

The $NH_4Cl$ solution 14 in the $NH_4Cl$ dissolving tank 37 is fed into a dissolved $NH_4Cl$ feed tank 52, and the dissolved $NH_4Cl$ feed tank 52 temporarily retains the $NH_4Cl$ solution 14 in the $NH_4Cl$ dissolving tank 37. The $NH_4Cl$ feed tank 52 includes a stirring unit 40-2, and keeps the $NH_4Cl$ concentration of the $NH_4Cl$ solution 14 in the dissolved $NH_4Cl$ feed tank 52 constant. The $NH_4Cl$ solution 14 in the dissolved $NH_4Cl$ feed tank 52 is then fed to the two-fluid nozzle 48, through the $NH_4Cl$ solution feed pipe 44 by a feed pump 53. The flow rate of the $NH_4Cl$ solution 14 in the $NH_4Cl$ solution feed pipe 44 is measured by a flowmeter 54-1, and the supply of the $NH_4Cl$ solution 14 is adjusted with a valve V2. The dissolved $NH_4Cl$ feed tank 52 is not essential and may not be used.

An air supplying unit 55 feeds the air 49 to the two-fluid nozzle 48 through the air feed pipe 50A, and the air 49 is used as compressed air, for spraying the $NH_4Cl$ solution 14 from the two-fluid nozzle 48. Accordingly, the $NH_4Cl$ solution 14 sprayed from the two-fluid nozzle 48 can be sprayed in fine liquid droplets. As shown in FIG. 1, the flow rate of the air 49 supplied from the air supplying unit 55 is measured by a flowmeter 54-2, and adjusted with a valve V3. The size of the liquid droplets of the $NH_4Cl$ solution 14 sprayed from the two-fluid nozzle 48 can be adjusted, by the flow rate of the air 49 supplied from the air supplying unit 55.

The flow rate of the air 49 injected from the two-fluid nozzle 48, for example, is preferably made at an air-water ratio of equal to or more than 100 and equal to or less than 10000 (volume ratio). This is to spray the $NH_4Cl$ solution 14 injected from the two-fluid nozzle 48 into the flue 13, in fine liquid droplets.

An air supplying unit 56 feeds the air 45 into the blow pipe 47 through the air feed pipe 51, and the air 45 is used as compressed air for dispersing the liquid droplets of the $NH_4Cl$ solution 14 sprayed from the two-fluid nozzle 48. As shown in FIG. 1, the flow rate of the air 45 supplied from the air supplying unit 56 is measured by a flowmeter 54-3, and adjusted with a valve V4. The air 45 is injected from a space 57 between the injection hole 46 of the blow pipe 47 and the two-fluid nozzle 48. Because the air 45 is injected from the space 57, the liquid droplets of the $NH_4Cl$ solution 14 sprayed from the two-fluid nozzle 48 can be dispersed into the flue 13 further more.

The air 45 injected from the injection hole 46 is used to prevent the $NH_4Cl$ solution 14 injected from the two-fluid nozzle 48 from being fixed to the blow pipe 47, and to prevent the temperature in the blow pipe 47 from increasing. Accordingly, the $NH_4Cl$ solution 14 is prevented from boiling and ammonium chloride particles are prevented from depositing.

The air 45 flows between the blow pipe 47 and the $NH_4Cl$ solution feed pipe 44. Accordingly, the air 45 acts as air for cooling the $NH_4Cl$ solution 14, and prevents the heat of the flue gas 12 in the flue 13 from being transmitted into the $NH_4Cl$ solution feed pipe 44 from the outside of the blow pipe 47. Because the temperature in the blow pipe 47 is prevented from increasing and the $NH_4Cl$ solution 14 is prevented from being heated, the $NH_4Cl$ solution 14 is prevented from boiling in the blow pipe 47, thereby keeping the liquid state of the $NH_4Cl$ solution 14 up to when the $NH_4Cl$ solution 14 is injected. It is also possible to prevent the two-fluid nozzle 48 from corroding.

Because the temperature in the blow pipe 47 can be prevented from increasing, a metal material can be used for the $NH_4Cl$ solution feed pipe 44 and the air feed pipe 50A. The material for the $NH_4Cl$ solution feed pipe 44 and the air feed pipe 50A may be, for example, as follows: The $NH_4Cl$ solution feed pipe 33 may be a corrosion resistant metal such as a nickel based heat resistant and corrosion resistant alloy like Hastelloy C, and a resin-lined steel pipe (low temperature portion). The air feed pipe 46 may be carbon steel, stainless-steel, and the like. The material for the $NH_4Cl$ solution feed pipe 44 and the air feed pipe 50A is not limited to the metal material.

Because the $NH_4Cl$ solution 14 can be supplied into the flue 13 from the dissolved $NH_4Cl$ feed tank 52 in a room temperature, an inexpensive resin or a resin-lined pipe can be used as a material for the $NH_4Cl$ solution feed pipe 44 and the blow pipe 47.

In the mercury reduction system 10A according to the present embodiment, for example, the number of the two-fluid nozzle 48 provided in the flue 13 is equal to or less than a few to a few tens. Conventionally, the number of generally used $NH_3$ grid provided in the flue 13, for example, is from a few hundreds to a few thousands. Alternatively, the number of the two-fluid nozzle 48 in the flue 13 is only from a few to a few tens, and the two-fluid nozzle 48 is fixed by flange portions 61 and 63. Accordingly, the nozzle can be replaced easily. In FIG. 4, two pieces of two-fluid nozzles 48 are provided. However, the present invention is not limited thereto, and a plurality of two-fluid nozzles 48 may be provided, based on the installation area in the flue 13.

As shown in FIG. 4, the blow pipe 47 includes the flange portion 61 at the outside of the flue 13 and the outer periphery of the blow pipe 47. The flange portion 61 is formed so as to correspond to the flange portion 63 provided at an end 62a of an opening 62 of the flue 13. Because the flange portion 61 of the blow pipe 47 is connected to the flange portion 63 provided at the flue 13, the blow pipe 47 is fixed to the flue 13. The flange portion 61 of the blow pipe 47 and the flange portion 63 of the flue 13 may be fixed by bolts, for example, by providing a plurality of holes at the outer peripheries of the flange portion 61 and the flange portion 63. The blow pipe 47 can be easily inserted and removed into and from the flue 13, by removably connecting the flange portion 61 and the flange portion 63. Accordingly, it is possible to easily maintain the insides of the blow pipe 47 and the flue 13.

The two-fluid nozzle 48 is used for spraying the NH$_4$Cl solution 14. However, the present invention is not limited thereto, and an ordinary injection nozzle for spraying liquid may be used.

Figure 6:
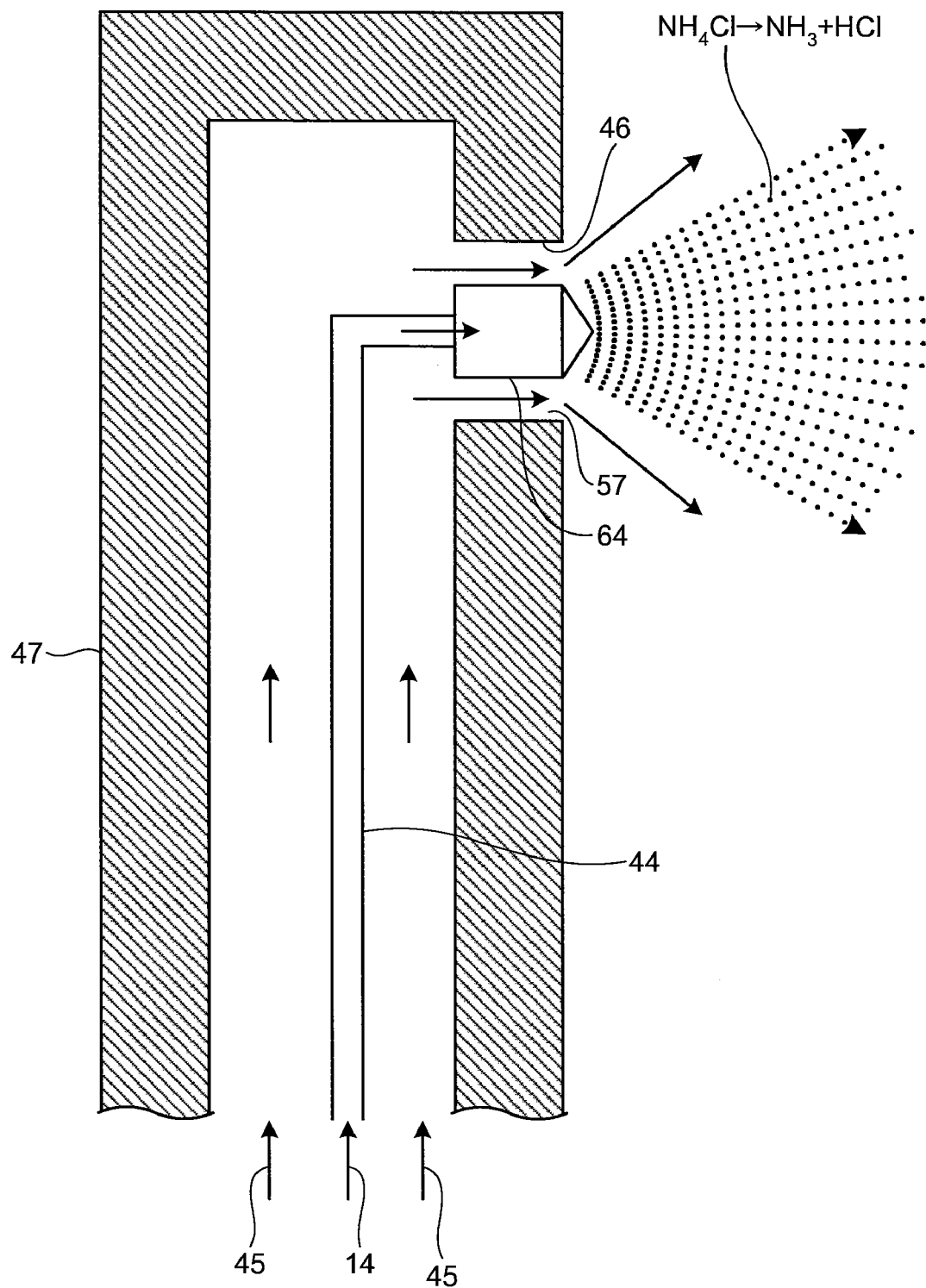
FIG. 6 is a partially enlarged sectional view of a blow pipe with an ordinary nozzle.

FIG. 6 is a partially enlarged sectional view of a blow pipe with an ordinary injection nozzle. As shown in FIG. 6, if the size of liquid droplets of the NH$_4$Cl solution 14 need not particularly be adjusted, the NH$_4$Cl solution 14 may be injected from an injection nozzle 64 and sprayed into the flue 13, accompanied with the air 49 injected from the injection hole 46.

The blow pipe 47 includes the NH$_4$Cl solution feed pipe 44 and the air feed pipe 50A therein, and the NH$_4$Cl solution 14 is sprayed into the flue 13 from the two-fluid nozzle 48. However, the present invention is not limited thereto. As long as the NH$_4$Cl solution 14 in the NH$_4$Cl solution feed pipe 44 is prevented from being heated, the NH$_4$Cl solution 14 may be sprayed into the flue 13, by connecting the NH$_4$Cl solution feed pipe 44 and the air feed pipe 50A with the two-fluid nozzle 48, without using the blow pipe 47.

Figure 7:
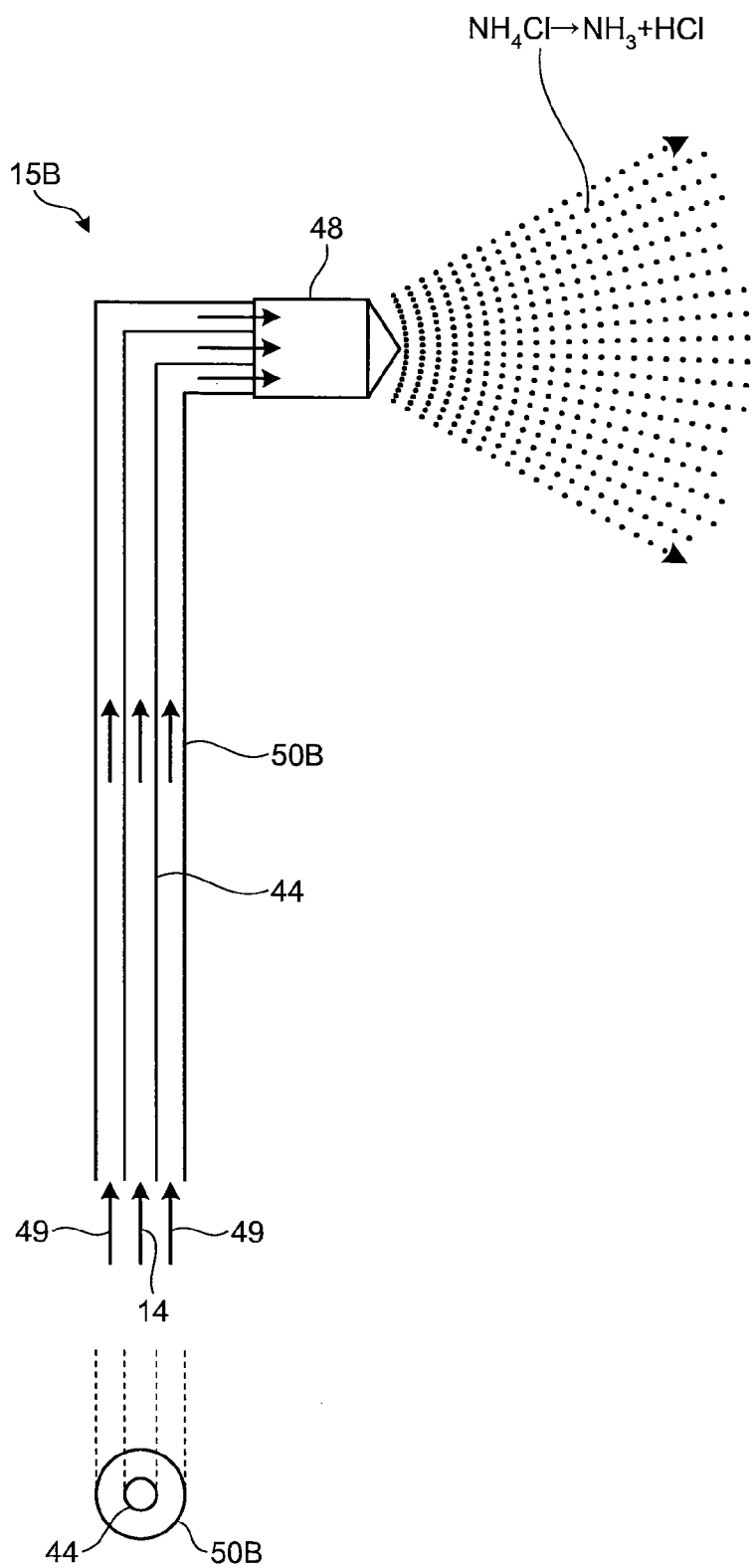
FIG. 7 is a schematic of another spraying method of $NH_4Cl$ solution with a two-fluid nozzle.
Figure 8:
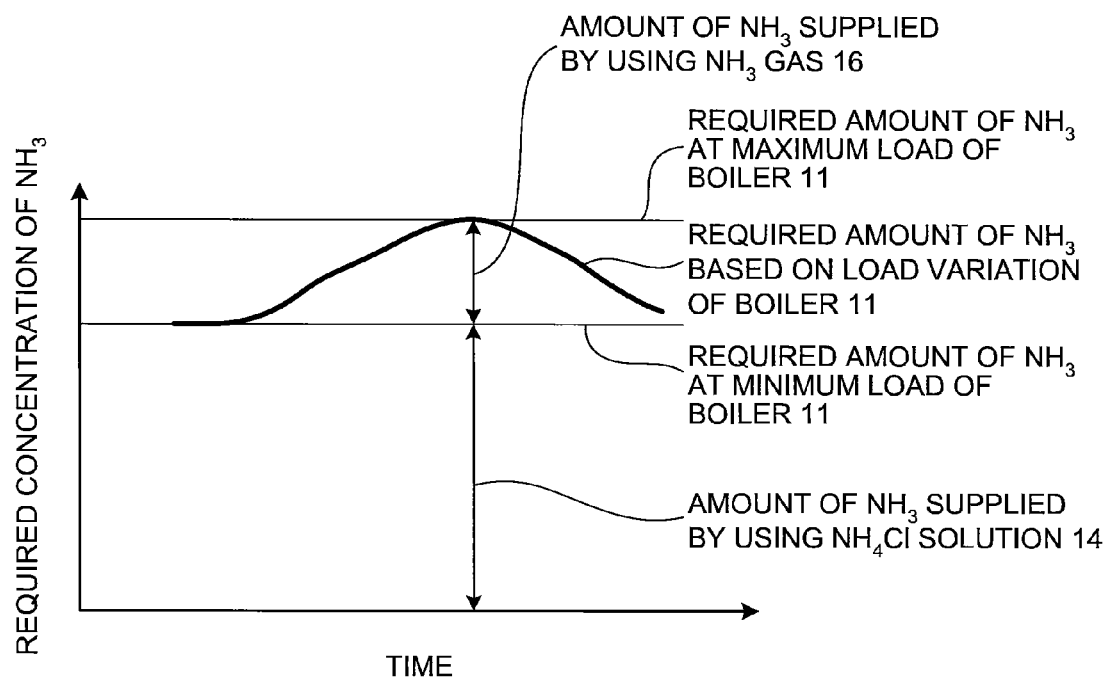
FIG. 8 is a schematic of another configuration of the mercury reduction system according to the first embodiment.

FIG. 7 is a schematic of another spraying method of NH$_4$4Cl solution with a two-fluid nozzle. As shown in FIG. 7, an NH$_4$Cl supplying unit 158 has a double pipe structure, and uses the NH$_4$Cl solution feed pipe 44 as an inner pipe, and an air feed pipe 50B as an outer pipe. The NH$_4$Cl solution feed pipe 44 and the air feed pipe 508 are connected to the two-fluid nozzle 48.

In other words, as shown in FIG. 7, the NH$_4$Cl supplying unit 15B includes the NH$_4$Cl solution feed pipe 44 for supplying the NH4Cl solution 14 into the flue 13, the air feed pipe 50B inserted into the flue 13 so as to surround the NH$_4$Cl solution feed pipe 44 for supplying the air 49 for spraying the NH$_4$Cl solution 14 into the flue 13, and the two-fluid nozzle 48 that is fixed to the ends of the NH$_4$Cl solution feed pipe 44 and the air feed pipe 50B and injects the NH$_4$Cl solution 14 and the air 49. Because the air feed pipe 50B surrounds the NH$_4$Cl solution feed pipe 44, the NH$_4$Cl solution 14 in the NH$_4$Cl solution feed pipe 44 is prevented from being heated by the flue gas 12 in the flue 13, due to the air 49 supplied into the air feed pipe 50B. The NH$_4$Cl solution 14 can also be splayed into the flue 13 accompanied with the air 49. Because the NH$_4$Cl supplying unit 158 does not include the blow pipe 47 as shown in FIGS. 4 to 6, the installation of the NH$_4$Cl solution feed pipe 44, the air feed pipe 50B, and the two-fluid nozzle 48 in the flue 13 can be simplified. Because the blow pipe 47 is not included, the NH$_4$Cl solution feed pipe 44, the air feed pipe 50B, and the two-fluid nozzle 48 can be easily replaced.

The air 49 is supplied from the air supplying unit 55 and the air 45 is supplied from the air supplying unit 56, and air is separately supplied from different supplying sources. However, the present invention is not limited thereto, and the air may be supplied from the same supplying source. In other words, the air 45 may be supplied from the air supplying unit 55, and the air 49 may be supplied from the air supplying unit 56.

The temperature of the flue gas 12 in the flue 13, for example, is equal to or more than 320° C. and equal to or less than 420° C., and is very hot. The NH$_4$Cl solution feed pipe 44 is provided in the blow pipe 47, and the air 45 is used to cool the NH$_4$Cl solution 14. Accordingly, the NH$_4$Cl solution 14 is maintained in a liquid state up to when the NH$_4$Cl solution 14 is injected from the two-fluid nozzle 48. Because the NH$_4$Cl solution 14 is sprayed from the two-fluid nozzle 48 in liquid droplets, the liquid droplets of the sprayed NH$_4$Cl solution 14 are evaporated, due to the high ambient temperature of the flue gas 12.

In other words, the sprayed liquid droplets of the NH$_4$Cl solution 14 temporarily generate fine NH$_4$Cl solid particles, because the liquid droplets are evaporated by the high ambient temperature of the flue gas 12, and as the following formula (1), decomposed into HCl gas and NH$_3$ gas, and sublimated. Accordingly, HCl gas and NH$_3$ gas are generated from the liquid droplets of the NH$_4$Cl solution 14 sprayed from the two-fluid nozzle 48, and can be supplied into the flue 13.

$$NH_4Cl \rightarrow NH_3 + HCl \tag{1}$$

The temperature of the flue gas 12 in the flue 13, although depending on the combustion condition of the boiler 11, for example, is preferably equal to or more than 320° C. and equal to or less than 420° C., more preferably equal to or more than 320° C. and equal to or less than 380° C., and more preferably equal to or more than 350° C. and equal to or less than 380° C. Accordingly, the reduction reaction of NOx and the oxidation reaction of Hg can be simultaneously carried out on a denitration catalyst.

The size of the hole of the two-fluid nozzle 48 is preferably equal to or more than 0.01 millimeter and equal to or less than 10 millimeters, and more preferably equal to or more than 0.1 millimeter and equal to or less than 5 millimeters.

The size of the liquid droplets of the NH$_4$Cl solution 14 spayed from the two-fluid nozzle 48 is preferably fine liquid droplets of equal to or more than 1 nanometer to equal to or less than 100 micrometers in average. By generating the fine liquid droplets of equal to or more than 1 nanometer to equal to or less than 100 micrometers in average, the solid particles of NH$_4$Cl generated from the liquid droplets of the sprayed NH$_4$Cl solution 14 can be decomposed into NH$_3$ gas and HCl gas in a short retention time in the flue gas 12, and sublimated. Because the NH$_4$Cl solution 14 does not need to be heated in advance, it is possible to prevent the flue 13 and the two-fluid nozzle 48 from being degraded and corroded.

Accordingly, in the NH$_4$Cl solution spraying unit 15A, the two-fluid nozzle 48 is used as a unit for spraying the NH$_4$Cl solution 14. Because the NH$_4$Cl solution 14 is sprayed from the two-fluid nozzle 48 in a liquid state, the NH$_4$Cl solution 14 can be decomposed into HCl gas and NH$_3$ gas by the high ambient temperature of the flue gas 12, and supplied into the flue 13. Consequently, a hydrogen chloride vaporizer, a spray grid, a hydrochloric acid solution tank, and the like in a mercury chlorinating agent feed device of the conventional mercury reduction system can be omitted.

The NH$_4$Cl powder 31 used for adjusting the NH$_4$Cl solution 14 is neutral salt. Accordingly, the NH$_4$Cl powder 31 is easy to handle, and is inexpensive and easy to obtain as can be used as fertilizer. Because NH$_3$ gas can be generated from the NH$_4$Cl solution 14, the usage of the NH$_3$ gas can be reduced. Because HCl is a dangerous substance, handling costs, such as a cost for transportation, a cost for legislative permission, and a facility cost for safety control are expensive. However, the NH$_4$Cl powder 31 can significantly reduce the handling cost.

The NH$_4$Cl solution 14 is dissolved in water and fully evaporated into NH$_3$ gas and HCl gas. Because NH$_4$Cl solid particles do not remain, it is possible to prevent the NH$_4$Cl solid particles from accumulating in the flue 13 and on the denitration catalyst provided in the downstream side. The denitration catalyst can also be prevented from deteriorating.

The NH$_4$Cl solution 14 is evaporated into NH$_3$ gas and HCl gas with the flue gas 12 used as a heat source. Accordingly, the installation of sublimation equipment such as a new heat source like steam, for evaporating the NH₄Cl solution 14, can be omitted. Consequently, it is possible to reduce the retention time required for evaporating the NH₄Cl solution 14 in the flue gas 12.

The flow rate of the NH₄Cl solution 14 sprayed from the two-fluid nozzle 48 is only a small amount of a few t/h compared with the amount of the flue gas, for example, of 1,500,000 m³N/h. Accordingly, the temperature of the flue gas 12 can be prevented from lowering, for example, to equal to or less than a few ° C. Consequently, it is possible to prevent SO3 in the flue gas 12 from condensing, and also prevent ash in the flue gas 12 from accumulating and fixing in the flue 13 and the like.

Compared with a mercury reduction system that supplies the solid powder of NH₄Cl into a flue, in other words, that sprays NH₄Cl by crushing the NH₄Cl solid, the mercury reduction system 10A according to the present embodiment can easily reduce the size of the liquid particles of the NH₄Cl solution 14, because the liquid such as the NH₄Cl solution 14 is used. Accordingly, solid particles having the size equal to or less than the sprayed fine liquid droplets can be generated. Consequently, is possible to significantly reduce the time required to decompose the NH₄Cl solution 14.

Because the NH₄Cl powder 31 is used for the NH₄Cl solution 14, NH₄Cl need not be finely crushed as a conventional method, but may be stored in the pellet state and used accordingly.

Supplying a single piece of NH₄Cl is less expensive than purchasing NH₃ gas and HCl gas separately, as in a conventional manner. Accordingly, an operation cost of the device can be reduced, thereby easily collecting the facility costs required for installation.

The supplies of the NH₄Cl powder 31 and the water 39 can be adjusted based on the concentration of the NH₄Cl solution 14. Accordingly, the concentration of the NH₄Cl solution 14 can be adjusted, based on the concentrations of NOx and Hg in the flue gas 12.

In the mercury reduction system 10A according to the present embodiment, the NH₄Cl solution spraying unit 15A only sprays the NH₄Cl solution 14. However, the present invention is not limited thereto. The reducing agent such as the NH₃ solution and the mercury chlorinating agent such as the HCl solution may be supplied separately. For example, at least one of NH₃ solution and HCl solution or both of them may be mixed into the NH₄Cl solution 14 in any proportion, and sprayed into the flue 13 as a mixed solution. Alternatively, NH₃ solution and HCl solution may be mixed in any proportion, and sprayed into the flue 13 as a mixed solution.

The HCl gas and the NH₃ gas generated from the liquid droplets of the NH₄Cl solution 14, as shown in FIG. 1, are fed to the reduction denitration apparatus 20 accompanied with the flue gas 12. The NH₃ gas generated by decomposing NH₄Cl, is used to carry out reduction denitration of NOx in the reduction denitration apparatus 20, and the HCl gas is used to carry out oxidation of Hg. Accordingly, NOx and Hg are reduced from the flue gas 12.

In other words, the reduction denitration apparatus 20 is filled with denitration catalyst. On the denitration catalyst, NH₃ is used to carry out reduction denitration of NOx as the following formula (2), and HCl is used to carry out oxidation of Hg as the following formula (3).

$$4NO+4NH_3+O_2 \rightarrow 4N_2+6H_2O \quad (2)$$

$$Hg+\tfrac{1}{2}O_2+2HCl \rightarrow HgCl_2+H_2O \quad (3)$$

<Mixed Gas Spraying Unit>

As shown in FIGS. 1 and 2, in the mercury reduction system 10A according to the present embodiment, the mixed gas spraying unit 19 is provided downstream of the NH₄Cl solution spraying unit 15A. The mixed gas spraying unit 19 includes an NH₃ gas supplying unit 71 that supplies NH₃ gas 16 used as a reducing agent as a gaseous material, an HCl gas supplying unit 72 that supplies HCl gas 17 used as a mercury chlorinating agent as a gaseous material, an NH₃ gas feed pipe 73 for supplying the NH₃ gas 16 into the flue 13 from the NH₃ gas supplying unit 71, and an NH₃ gas feed pipe 74 that connects between the HCl gas supplying unit 72 and the NH₃ gas feed pipe 73.

The mixed gas spraying unit 19 mixes the NH₃ gas 16 and the HCl gas 17 before feeding into the flue 13, and generates mixed gas 18. The NH₃ gas 16 and the HCl gas 17 are measured by flowmeters 54-4 and 54-5, respectively, and the flow rates are adjusted by controlling adjusting valves V5 and V6. The mixed gas 18 is measured by a flowmeter 54-6, and the flow rate is adjusted by an adjusting valve V7.

The mixed gas 18 flows through the NH₃ gas feed pipe 73, and injected into the flue 13 from an injection nozzle 75. The NH₃ gas 16 and the HCl gas 17 in the mixed gas 18, similar to the HCl gas and the NH₃ gas generated from the liquid droplets of the NH₄Cl solution 14, are fed into the reduction denitration apparatus 20 accompanied with the flue gas 12. As described above, on the denitration catalyst of the reduction denitration apparatus 20, the NH₃ gas is used to carry out reduction denitration, as the following formula (4), and the HCl gas is used to carry out oxidation of Hg as the following formula (5).

$$4NO+4NH_3+O_2 \rightarrow 4N_2+6H_2O \quad (4)$$

$$Hg+\tfrac{1}{2}O_2+2HCl \rightarrow HgCl_2+H_2O \quad (5)$$

Because the NH₃ gas 16 and the HCl gas 17 are supplied separately, the NH₃ gas 16 and the HCl gas 17 in the mixed gas 18 may be adjusted to any concentration in advance and fed into the flue 13.

Because the mixed gas 18 is not in a liquid state as the NH₄Cl solution 14, the mixed gas 18 does not collide with the structures in the flue 13 and damage the structures by thermal shock. Accordingly, the mixed gas 18 can be supplied to a region even where the concentration of the sprayed NH₄Cl solution 14 becomes low. Consequently, the region where the concentration of the NH₄Cl solution 14 becomes low in the flue 13 can be eliminated, and the fluctuation of concentration distribution of the NH₃ gas, which is the reducing agent, and the HCl gas, which is the mercury chlorinating agent, can be reduced.

The distance between the position of the two-fluid nozzle 48 that sprays the NH₄Cl solution 14 and the position of the injection nozzle 75 that injects the mixed gas 18 is preferably maintained in a distance so that NH₄Cl does not redeposit. This is because NH₄Cl may be deposited when the NH₃ gas 16 in the mixed gas 18 is injected.

Because the injection nozzle 75 is provided in the flue 13, and a part of the NH₃ gas feed pipe 73 is inserted into the flue 13, the mixed gas 18 can be heated. Accordingly, it is possible to maintain the gaseous state of the NH₃ gas 16 and the HCl gas 17 in the mixed gas 18.

The temperature of the injection nozzle 75 and the temperature of the NH₃ gas feed pipe 73 inserted into the flue 13 are, for example, preferably equal to or more than 270° C., and more preferably equal to or more than 350° C. This is to prevent NH₄Cl from being deposited to the end of the injection nozzle 75 and in the NH₃ gas feed pipe 73. If the temperature of the injection nozzle 75 and the temperature of the NH$_3$ gas feed pipe 73 are equal to or more than 350° C., it is possible to gasify the NH$_3$ gas 16 and the HCl gas 17 without fail.

To maintain the gaseous state of the NH$_3$ gas 16 and the HCl gas 17 in the mixed gas 18 without fail, a heater to heat the mixed gas 18 may be included in the NH$_3$ gas feed pipe 73.

In the mercury reduction system 10A according to the present embodiment, the NH$_3$ gas 16 as well as the HCl gas 17 is used as gaseous material. However, the present invention is not limited thereto. For example, gas formed of other hydrogen halide such as hydrogen bromide (Hbr), and hydrogen iodide (HI) may be used as the mercury chlorinating agent, instead of the HCl gas 17.

The NH$_3$ gas 16 is used as a reducing agent. However, the present invention is not limited thereto, and any gaseous material that can reduce NOx may be used.

<Advantages of Combining NH$_4$Cl Solution Spraying Unit and Mixed Gas Spraying Unit>

As the mercury reduction system 10A according to the present embodiment, the following advantages can be obtained by combining the NH$_4$Cl solution spraying unit 15A and the mixed gas spraying unit 19.

1) In other words, in the mercury reduction system 10A according to the present embodiment, the NH$_4$Cl solution spraying unit 15A sprays the NH$_4$Cl solution 14 as a liquid material, and the mixed gas spraying unit 19 supplies the mixed gas 18 containing the NH$_3$ gas 16 and the HCl gas 17 into the flue 13 of the boiler 11 as a gaseous material. Accordingly, appropriate amounts of NH$_3$ gas and HCl gas can be supplied, based on the gaseous nature of the flue gas 12.

2) A region where the concentrations of NH$_3$ gas and HCl gas generated from NH$_4$Cl are low is produced near the inner wall of the flue 13, if just the NH$_4$Cl solution 14 is supplied into the flue 13. This is because, when the NH$_4$Cl solution 14 and the like is sprayed into the flue 13, the low-temperature liquid droplets may collide with the structures such as a duct wall and a support member (beam) in the flue 13. Accordingly, the thermal strain is caused by thermal shock, thereby damaging the structures. To prevent this, the spraying nozzle is installed so that the liquid droplets of the NH$_4$Cl solution 14 do not collide with the structures before evaporating. By doing so, the concentrations of NH$_3$ gas and HCl gas generated from the NH$_4$Cl solution 14 near the structures such as the inner wall of the flue 13 may be lowered.

Alternatively, in the mercury reduction system 10A according to the present embodiment, the mixed gas 18 containing the NH$_3$ gas 16 and the HCl gas 17 are supplied into the flue 13 of the boiler 11 as a gaseous material, after the NH$_4$Cl solution 14 is sprayed as, a liquid material. Accordingly, even if a region where the concentration of the NH$_4$Cl solution 14 becomes low may be generated by just spraying the NH$_4$Cl solution 14, the region where the concentrations of the NH$_3$ gas and the HCl gas generated from the NH$_4$Cl solution 14 become low can be eliminated, by supplying the mixed gas 18 to the region where the concentration of the NH$_4$Cl solution 14 becomes low. Accordingly, it is possible to reduce the fluctuation of concentration distribution of NH$_3$ gas and HCl gas.

3) By adjusting the concentrations of NH$_3$ and HCl in the NH$_4$Cl solution 14, and the feed ratio of the NH$_3$ gas 16 and the HCl gas 17 in the mixed gas 18, the supplies of NH$_3$ gas used as a reducing agent and HCl gas used as a mercury chlorinating agent can be arbitrarily adjusted, based on the gaseous nature of the flue gas 12.

4) By supplying the NH$_4$Cl solution 14 used as the liquid material at a constant volume or in a staged manner, the supply of the mixed gas 18 used as the gaseous material can be controlled over the time based on the required amount. A nozzle such as the two-fluid nozzle 48 or the injection nozzle 64 is used for supplying a liquid material such as the NH$_4$Cl solution 14. The size of the liquid droplet injected from the nozzle is changed, according to the variation of the supply of the NH$_4$Cl solution 14. In particular, if the supply of the NH$_4$Cl solution 14 is reduced, the size of the sprayed liquid droplet of the NH$_4$Cl solution 14 becomes large, thereby increasing the evaporation time. Accordingly, the liquid droplets of the NH$_4$Cl solution 14 not being evaporated are more likely to be collided with the structures in the flue 13. The temperature in the nozzle may also be increased, and the material is more likely to deposit in the nozzle. Consequently, it is not preferable to change the supply of the NH$_4$Cl solution 14, which is a liquid material.

Alternatively, in the mercury reduction system 10A according to the present embodiment, the supply proportion of the NH$_4$Cl solution 14 and the mixed gas 18 can be adjusted. By controlling the supplies of NH$_3$ gas and HCl gas over the time based on their required amounts by using the NH$_4$Cl solution 14 or the NH$_3$ gas 16, appropriate amounts of NH$_3$ gas and HCl gas can be supplied, based on the load variation of the boiler 11.

Figure 9:
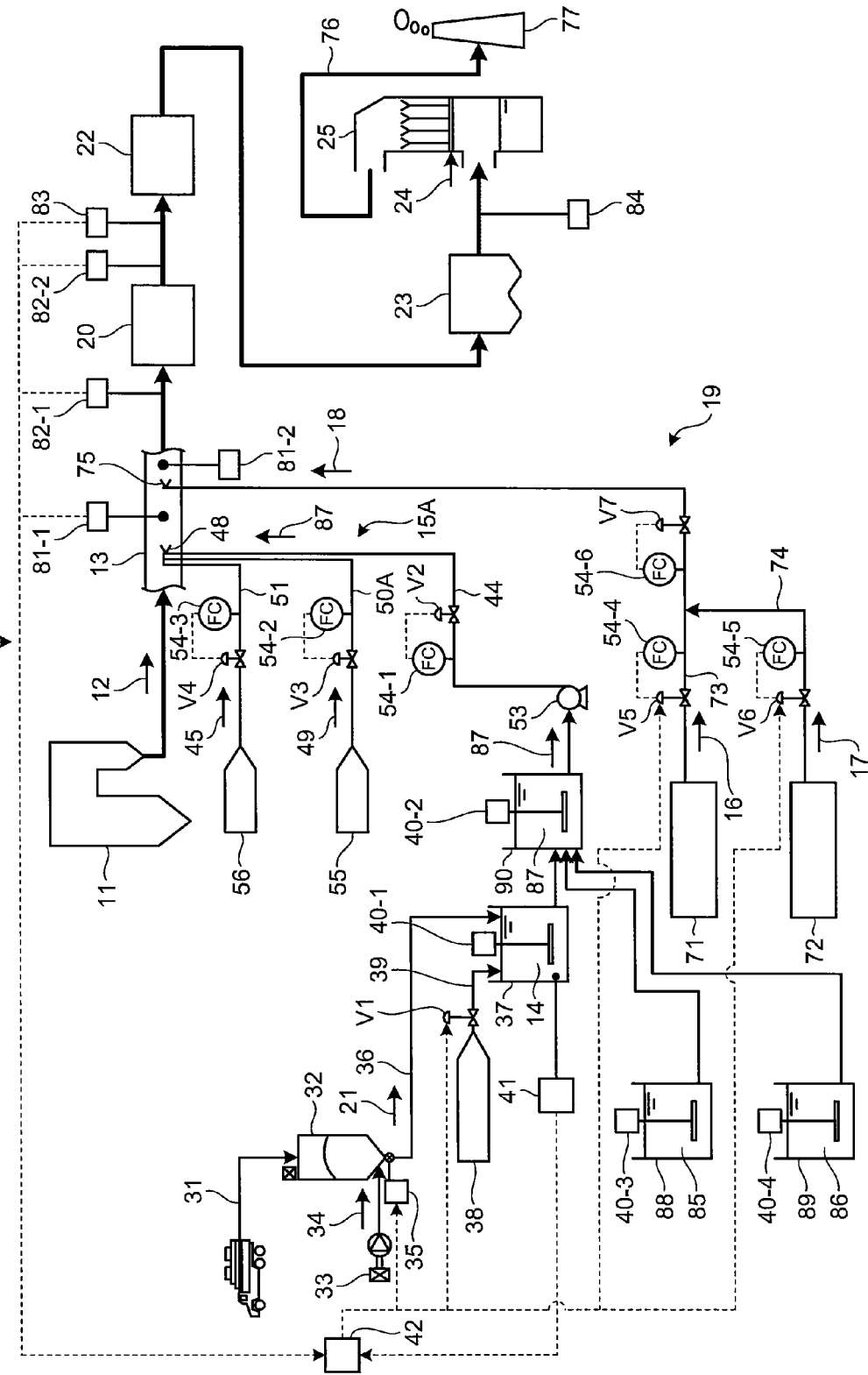
FIG. 9 is a schematic of an example of the relationship between time and the required concentration of $NH_3$.

FIG. 9 is a schematic of an example of the relationship between time and the required concentration of NH$_3$. The required amount of NH$_3$, when NH$_3$ is supplied according to the load variation of the boiler 11 with the NH$_4$Cl solution 14 used as the liquid material and the NH$_3$ gas 16 used as the gaseous material, is shown.

As shown in FIG. 9, it is assumed that the NH$_4$Cl solution 14 is supplied at a constant volume or in a staged manner, and for example, the required amount of NH$_3$ at the minimum load (for example, approximately 70%) of the boiler 11, is supplied by the NH$_4$Cl solution 14 in a certain proportion, while recognizing a range of the load variation of the boiler 11 in advance. The required amount of NH$_3$ from the minimum load to the maximum load (for example, approximately 100%) of the boiler 11 is supplied by the mixed gas 18, and the required amount of NH$_3$ is supplied by the NH$_3$ gas. In other words, if the actual load variation is equal to or more than 70% and equal to or less than 100%, a difference between the actual load variation and a certain amount of minimum load (in FIG. 9, 70%), in other words, equal to or more than 0% and equal to or less than 30% is supplied by the NH$_3$ gas 16. Accordingly, by controlling the supply of NH$_3$ with the NH$_4$Cl solution 14 or the NH$_3$ gas 16 over the time, based on the required amount, an appropriate amount of NH$_3$ can be supplied corresponding to the load variation of the boiler 11.

5) The required amounts of NH$_3$ and HCl may be calculated from the measured data of the NOx concentration and the Hg concentration of the NH$_4$Cl solution 14, the flue gas 12, and the like, thereby determining the supplies of the NH$_4$Cl solution 14 and the NH$_3$ gas 16.

The required amount of NH$_3$ is determined, based on a predetermined distribution range corresponding to the fluctuations of the NOx amount, the NOx concentration, and the like. The NOx amount can be calculated by multiplying the NOx concentration and the flow rate of the flue gas 12, as the following formula (6).

$$\text{NOx amount} = \text{NOx concentration} \times \text{flow rate of flue gas 12} \tag{6}$$

The required amount of HCl is determined based on the predetermined distribution range corresponding to the amount of metallic mercury (Hg$^0$), the oxidation rate of Hg, the fluctuation of Hg concentration, and the like. The H$^0$ amount, for example, is calculated by multiplying the $Hg^0$ concentration and the flow rate of the flue gas 12, as the following formula (7).

$$Hg^0 \text{ amount} = Hg^0 \text{ concentration} \times \text{flow rate of flue gas } 12 \quad (7)$$

Accordingly, the required amount of $NH_3$ can always be determined instantly.

6) When the supply of the $NH_4Cl$ solution 14 is controlled, the supply of the $NH_4Cl$ solution 14 per one piece of two-fluid nozzle 48 is controlled by increasing and decreasing the number of nozzles used for spraying the $NH_4Cl$ solution 14, while maintaining the supply of the $NH_4Cl$ solution 14 in the entire two-fluid nozzle 48 at a constant amount. At this time, to prevent the deposition of $NH_4Cl$, water and the like is supplied to the two-fluid nozzle 48 to which the $NH_4Cl$ solution 14 is not supplied. Accordingly, the supply of the $NH_4Cl$ solution 14 can be controlled, while preventing deposition of scale and the like in the nozzle used for spraying the $NH_4Cl$ solution 14 caused by $NH_4Cl$ in the $NH_4Cl$ solution 14.

As shown in FIG. 1, the flue gas 12 is fed into the wet desulfurization apparatus 25 through the air heater 22 and the dust collector 23, after NOx is reduced and Hg is oxidized in the flue gas 12, in the reduction denitration apparatus 20. A heat collector may be provided between the air heater 22 and the dust collector 23. HgCl in the flue gas 12 is absorbed by the limestone-gypsum slurry 24 used as an alkali absorbent in the wet desulfurization apparatus 25, and separated and removed from the flue gas 12. Accordingly, the flue gas 12 is purified. The purified flue gas is discharged from a stack 77 as purified gas 76. Here, the limestone-gypsum slurry 24 is used as the alkali absorbent. However, any solution that can absorb HgCl in the flue gas 12 can be used as the alkali absorbent.

A mixer that mixes $NH_3$ gas and HCl gas may be provided downstream of the two-fluid nozzle 48 and upstream of the reduction denitration apparatus 20. The mixer, for example, may be a static mixer and the like. If the $NH_3$ gas and the HCl gas generated by evaporating the $NH_4Cl$ solution 14 sprayed from the two-fluid nozzle 48 are not dispersed enough, the mixer provided upstream of the reduction denitration apparatus 20 can uniformly disperse the $NH_3$ gas and the HCl gas in the flue gas 12.

A flowmeter 81-1 that measures a flow rate of the $NH_4Cl$ solution 14 sprayed from the two-fluid nozzle 48, and a flowmeter 81-2 that measures a flow rate of the mixed gas 18 injected from the injection nozzle 75, may be provided downstream of the two-fluid nozzle 48. Accordingly, the flow rate of the $NH_4Cl$ solution 14 sprayed from the two-fluid nozzle 48 and the flow rate of the mixed gas 18 injected from the injection nozzle 75 can be measured. The flow velocity of the flue gas 12 in the flue 13 can also be measured.

NOx concentration meters 82-1 and 82-2 are provided at an inlet side and an outlet side of the reduction denitration apparatus 20. The reduction rate of NOx in the reduction denitration apparatus 20 can be identified from the NOx concentration value in the flue gas 12 measured by the NOx concentration meters 82-1 and 82-2. By controlling the concentration of the $NH_4Cl$ solution 14 and the supply flow rate of the $NH_3$ gas 16 from the value of the NOx concentration in the flue gas 12 measured by the NOx concentration meters 82-1 and 82-2, the concentration and the supply flow rate of the $NH_4Cl$ solution 14 sprayed from the two-fluid nozzle 48 and the supply flow rate of the $NH_3$ gas 16 in the mixed gas 18 can be adjusted, thereby satisfying a predetermined denitration performance.

The concentrations of $NH_3$ and HCl of the flue gas 12 supplied into the flue 13 are set, relative to the NOx concentration of the flue gas 12, so that the ratio between the molar number of $NH_3$ and the molar number of NOx in the flue gas 12 ($NH_3$/NOx molar ratio) is a value equal to or less than one, based on the required denitration performance.

The $NH_3$ gas dissociated from the $NH_4Cl$ solution 14 may be sprayed into the flue 13, and $NH_3$ obtained from the $NH_3$ gas 16 may be injected into the flue 13, so that the $NH_3$ concentration and the HCl concentration are from a few tens to a few hundred parts per million, or preferably from a few tens to 200 parts per million. This is because $NH_3$ and NOx react at a molar ratio of 1:1, and if $NH_3$ is over-supplied, an excess of $NH_3$ is remained after the reaction. Acid sulfate is produced from $NH_3$ and the components in the flue gas 12, and may corrode and damage the inside of the flue 13, the air heater 22, the dust collector 23, and the like, and may lead to blockage due to ash deposition. Accordingly, it is possible to prevent the flue gas 12 from leaking from the damaged flue 13.

The Hg concentration in the flue gas 12 is equal to or more than 0.1 $\mu g/m^3 N$ and equal to or less than a few ten $\mu g/m^3 N$, and for the HCl concentration in the flue gas 12, it is equal to less than 1/1000 in molar ratio.

The mercury reduction system 10A according to the present embodiment also includes a mercury (Hg) concentration meter 83 that measures mercury (Hg) contained in the treatment gas discharged from the reduction denitration apparatus 20, and a hydrogen chloride (HCl) concentration meter 84 that measures HCl contained in the flue gas 12 supplied to the wet desulfurization apparatus 24. The Hg concentration meter 83 may be provided downstream of the wet desulfurization apparatus 25, and may measure mercury (Hg) contained in the treatment gas discharged from the wet desulfurization apparatus 25.

The oxidation rate of Hg in the reduction denitration apparatus 20 can be identified from the values of the HCl concentration and the Hg concentration in the flue gas 12 measured by the Hg concentration meter 83 and the HCl concentration meter 84. The supply flow rate of the $NH_4Cl$ solution 14 sprayed from the two-fluid nozzle 48 and the supply flow rate of the HCl gas 17 in the mixed gas 18 are adjusted, from the values of the Hg concentration in the flue gas 12 measured by the Hg concentration meter 83 and the HCl concentration meter 84. Accordingly, a predetermined denitration performance can be satisfied and the oxidation performance of Hg can be maintained.

The additional amount of the $NH_4Cl$ solution 14 and the supply flow rate of the HCl gas 17 are controlled, so that the combination of the HCl gas dissociated from the $NH_4Cl$ solution 14 and the HCl gas 17 to be added, has the mercury oxidation rate ($Hg^{2+}/Hg^T$) of equal to or more than 95% or the metallic mercury concentration ($Hg^0$) of equal to or less than 1 $\mu g/Nm^3$, at the outlet of the reduction denitration apparatus 20. $Hg^T$ is the total mercury concentration, and expressed by a sum of the metallic mercury concentration ($Hg^0$) and the oxidized mercury concentration ($Hg^{2+}$), as the following formula (8).

$$Hg^T = Hg^0 + Hg^{2+} \quad (8)$$

The supplies of the $NH_4Cl$ solution 14, the $NH_3$ gas 16, and the HCl gas 17 may be determined by calculating the contents of NOx and Hg in the flue gas 12, from the nature of coal used in the boiler 11. In other words, the contents of NOx, Hg, and HCl in the flue gas 12 can be obtained by burning the nature of coal in the boiler 11. When the maximum amount of the coal is burned in the boiler 11, the maximum amounts of NOx and Hg in the flue gas 12 can be obtained from the combustion amount of the boiler 11. Consequently, the supplies of the $NH_4Cl$ solution 14, the $NH_3$ gas 16, and the HCl gas 17 can be determined by obtaining the contents of NOx, Hg, and HCl in the flue gas 12 from the nature of the coal used in the boiler 11.

Accordingly, the mercury reduction system 10A according to the present embodiment supplies the $NH_3$ gas 16 and the HCl gas 17 into the flue 13, based on the balance of the concentrations of NOx and Hg in the flue gas 12 discharged from combustion equipment such as the boiler 11. Accordingly, HCl or $NH_3$ can be supplied by adjusting the required amount.

<Method of Controlling Supply>

If the mercury oxidation rate ($Hg^{2+}/Hg^T$) obtained by the Hg concentration meter 83 is smaller than 0.95, or if the metallic mercury concentration ($Hg^0$) is larger than 1 $\mu g/Nm^3$, the amount of HCl to be added is increased.

The NOx concentration meter 82-2 measures the NOx concentration and the $NH_3$ concentration at the outlet side of the reduction denitration apparatus 20, and if the measured $NH_3$ concentration is larger than 1 part per million, the amount of $NH_3$ to be added is reduced. If the $NH_3$ concentration measured by the NOx concentration meter 82-2 is smaller than 1 part per million, the amount of $NH_3$ to be added is increased. However, the $NH_3$ concentration is set, so that the ratio of the molar number of NH for the molar number of NOx ($NH_3$/NOx molar ratio) in the flue gas 12, is a value equal to or less than 1 based on the required denitration performance, relative to the NOx molar flow velocity (mol/H) at the inlet side of the flue gas 12.

In the mercury reduction system 10A according to the present embodiment, the position of the two-fluid nozzle 48 that sprays the $NH_4Cl$ solution 14 is placed upstream of the position from which the mixed gas 18 is injected. This is because the $NH_4Cl$ solution 14 takes time to evaporate and vaporize, than the $NH_3$ gas 16 and the HCl gas 17. However, the present invention is not limited thereto, and the position from which the mixed gas 18 is injected may be placed upstream of the position of the two-fluid nozzle 48 that sprays the $NH_4Cl$ solution 14.

Consequently, in the mercury reduction system 10A according to the present embodiment, it is possible to satisfy the predetermined denitration performance and appropriately respond to maintain the Hg oxidation performance, based on the variation of the concentration of NOx or Hg in the flue gas 12, by controlling the supplies of the $NH_4Cl$ solution 14, the $NH_3$ gas 16, and the HCl gas 17.

In the mercury reduction system 10A according to the present embodiment, the $NH_4Cl$ solution spraying unit 15A uses $NH_4Cl$ as an oxidation-reduction agent. However, the present invention is not limited thereto. For example, an ammonium halide such as ammonium bromide ($NH_4Br$) and ammonium iodide ($NH_4I$) other than $NH_4Cl$ may be used as the oxidation-reduction agent, and the aqueous solution may be used as the liquid material.

In the mercury reduction system 10A according to the present embodiment, $NH_4Cl$ is decomposed into $NH_3$ gas and HCl gas, thereby generating a reducing agent and a mercury chlorinating agent. The $NH_4Cl$ solution spraying unit 15A only sprays the $NH_4Cl$ solution 14 as the liquid material. However, the present invention is not limited thereto. In the mercury reduction system 10A according to the present embodiment, the $NH_4Cl$ solution 14 may be used, by mixing at least one of a solution containing a reducing agent and a solution containing a mercury chlorinating agent or both of them.

Figure 10:
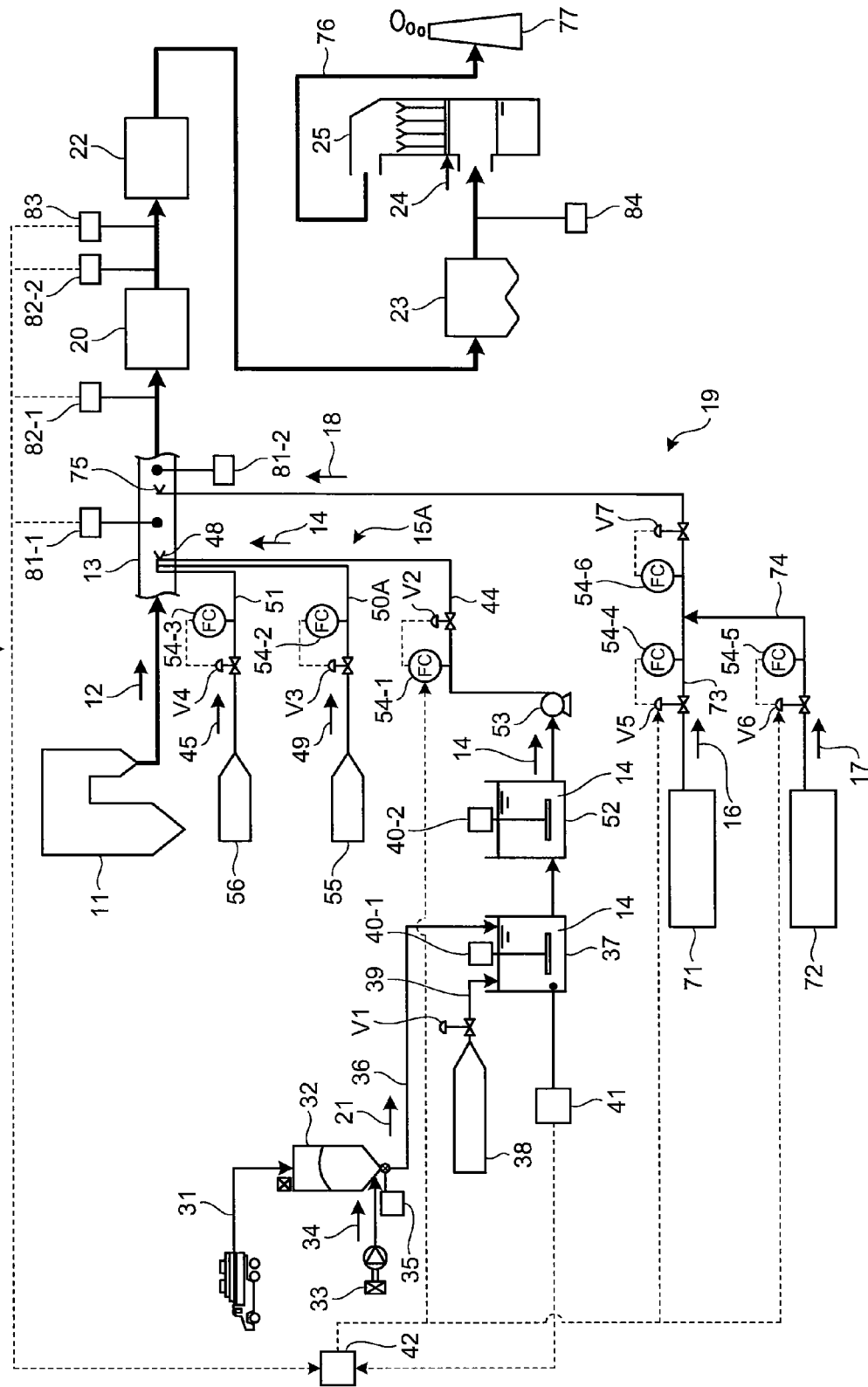
FIG. 10 is a schematic of a mercury reduction system according to a second embodiment of the present invention.

FIG. 10 is a schematic of a configuration in which a mixed solution obtained by mixing an ammonia ($NH_3$) solution generated by dissolving ammonia used as a reducing agent, and a hydrogen chloride (HCl) solution generated by dissolving hydrogen chloride used as a mercury chlorinating agent.

As shown in FIG. 10, the mercury reduction system 10A according to the present embodiment sprays a mixed solution 87 obtained by mixing the $NH_4Cl$ solution 14, $NH_3$ solution 85, and HCl solution 86 into the flue 13 from the two-fluid nozzle 48. The mercury reduction system 10A supplies the $NH_4Cl$ solution 14 in the NH4Cl dissolving tank 37, the $NH_3$ solution 85 in an ammonia ($NH_3$) dissolving tank 88, and the HCl solution 86 in a hydrogen chloride (HCl) dissolving tank 89 to a mixed solution tank 90, and mixes in the mixed solution tank 90. The obtained mixed solution 87 is fed to the two-fluid nozzle 48 and sprayed into the flue 13 from the two-fluid nozzle 48. Because $NH_3$ and HCl can be supplied separately, an appropriate response can be made depending on the concentration of NOx or Hg in the flue gas 12. The $NH_3$ dissolving tank 88 and the HCl dissolving tank 89 include stirring units 40-3 and 40-4, respectively, thereby keeping the $NH_3$ concentration of the $NH_3$ solution 85 in the $NH_3$ dissolving tank 88 constant, and keeping the HCl concentration of the HCl solution 86 in the HCl dissolving tank 89 constant.

$NH_3$ is used as a reducing agent, however, urea (($H_2N$)$_2C=O$) and the like with reducing action may be used as a reducing agent, and use the aqueous solution. To adjust the $NH_4Cl$ solution 14, for example, urea (($H_2N$)$_2C=O$) may be dissolved into the water 39 as well as the $NH_4Cl$ powder 31, and the aqueous solution in which the $NH_4Cl$ powder 31 and the urea are mixed may be used. In a boiler facility, nitrogen oxide concentration may vary. In such an event, the supply of $NH_3$ may be increased, by adding the urea as well as $NH_4Cl$.

HCl is used as a mercury chlorinating agent. However, a hydrogen halide such as hydrogen bromide (Hbr) and hydrogen iodide (HI) other than HCl may be used as a mercury chlorinating agent, and use the aqueous solution.

When an oxidation-reduction agent such as an ammonium halide is not used, a mixed solution obtained by mixing at least one of a solution in which a reducing agent is dissolved in water and an aqueous solution in which a mercury chlorinating agent is dissolved, or both of them may be used as the liquid material.

In this manner, with the mercury reduction system 10A according to the present embodiment, the $NH_4Cl$ solution spraying unit 15A sprays the $NH_4Cl$ solution 14, and the mixed gas spraying unit 19 supplies the mixed gas 18 containing the $NH_3$ gas 16 and the HCl gas 17 into the flue 13 of the boiler 11. The $NH_4Cl$ solution 14 sprayed in a liquid state is evaporated, and decomposed into HCl gas and $NH_3$ gas, whereby Hg is oxidized and NOx is reduced in the flue gas 12 on the denitration catalyst. By adjusting the proportion of the $NH_3$ gas 16 and the HCl gas 17 in the mixed gas 18, an appropriate amount of a reducing agent and a mercury chlorinating agent can be arbitrarily supplied, based on the gaseous nature of the flue gas 12. Accordingly, an appropriate amount of the reducing agent and the mercury chlorinating agent can be arbitrarily supplied based on the gaseous nature of the flue gas 12 with a single supplying unit. Because the mixed gas 18 can be supplied to a region where the concentration of the $NH_4Cl$ solution 14 becomes low, it is possible to reduce the fluctuation of concentration distribution of the reducing agent and the oxidation-reduction agent.

Second Embodiment

A mercury reduction system according to a second embodiment of the present invention will now be described with reference to the accompanying drawings. FIG. 10 is a schematic of the mercury reduction system according to the second embodiment of the present invention. The same members as those of the mercury reduction system according to the first embodiment are denoted by the same reference numerals, and the detailed descriptions thereof will be omitted.

As shown in FIG. 10, a mercury reduction system 10B according to the present embodiment adjusts the flow rate of the $NH_4Cl$ solution 14 that flows though the $NH_4Cl$ solution feed pipe 44 from the dissolved $NH_4Cl$ feed tank 52 via the feed pump 53, based on the concentration of $NH_4Cl$ of the $NH_4Cl$ solution 14 with the valve V2.

The arithmetic apparatus 42 calculates the supply speed of the $NH_4Cl$ solution 14, based on the concentration value of the $NH_4Cl$ solution 14 measured by the $NH_4Cl$ concentration meter 41. The supply speed of the $NH_4Cl$ solution 14 calculated by the arithmetic apparatus 42 is transmitted to the valve V2, thereby adjusting the opening and closing of the valve V2. Accordingly, the flow rate of the $NH_4Cl$ solution 14 that flows through the $NH_4Cl$ solution feed pipe 44 can be adjusted. The supply flow rate of the $NH_3$ gas 16 and the HCl gas 17 can also be adjusted in any proportion. For example, on referring to the flow rate of the $NH_4Cl$ solution 14 when the concentration of the $NH_4Cl$ solution 14 is about 20 wt %, if the concentration of the $NH_4Cl$ solution 14 is higher than 20 wt %, the flow rate of the $NH_4Cl$ solution 14 is lowered, and if the concentration of the $NH_4Cl$ solution 14 is lower than 20 wt %, the flow rate of the $NH_4Cl$ solution 14 is increased. The supply flow rates of the $NH_3$ gas 16 and the HCl gas 17 are also adjusted, based on the supply flow rate of the $NH_4Cl$ solution 14.

Accordingly, the $NH_4Cl$ solution 14 can be supplied into the flue 13 from the two-fluid nozzle 48 at an appropriate flow rate, based on the concentration of the $NH_4Cl$ solution 14 in the $NH_4Cl$ dissolving tank 37. The $NH_3$ gas 16 and the HCl gas 17 can be supplied into the flue 13 in any proportion, based on the concentration of the $NH_4Cl$ solution 14. Consequently, the $NH_4Cl$ solution 14, the $NH_3$ gas 16, and the HCl gas 17 can be arbitrarily supplied, and the fluctuation of concentration distribution of the reducing agent and the oxidation-reduction agent can be reduced. As a result, it is possible to evaporate $NH_4Cl$ without fail, thereby preventing powder from remaining and the like due to $NH_4Cl$.

Third Embodiment

A mercury reduction system according to a third embodiment will now be described with reference to the accompanying drawings.

Figure 11:
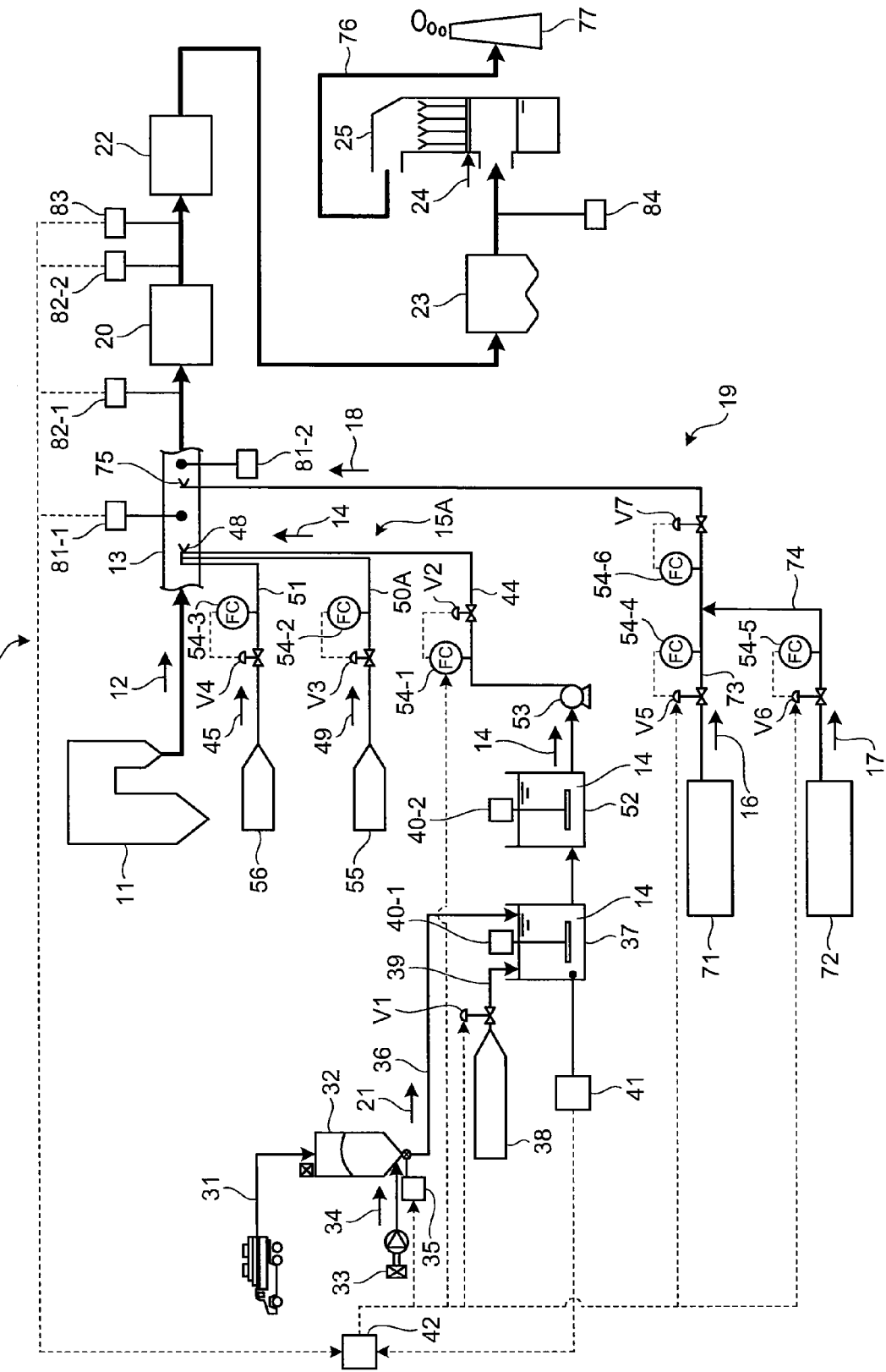
FIG. 11 is a schematic of a mercury reduction system according to a third embodiment of the present invention.

FIG. 11 is a schematic of the mercury reduction system according to the third embodiment of the present invention. The same members as those of the mercury reduction system according to the first and the second embodiments are denoted by the same reference numerals, and the detailed descriptions thereof will be omitted.

As shown in FIG. 11, a mercury reduction system 10C according to the present embodiment adjusts the supply of the $NH_4Cl$ powder 31 in the silo 32 fed to the $NH_4Cl$ dissolving tank 37, based on the concentration of $NH_4Cl$ of the $NH_4Cl$ solution 14, the supply of the water 39 fed to the $NH_4Cl$ dissolving tank 37 from the water supplying tank 38, the flow rate of the $NH_4Cl$ solution 14 flown through the $NH_4Cl$ solution feed pipe 44 from the dissolved $NH_4Cl$ feed tank 52 by the feed pump 53, and the supply flow rate of the $NH_3$ gas 16 and the HCl gas 17.

The concentration of the $NH_4Cl$ solution 14 is arbitrarily adjusted, because the arithmetic apparatus 42 adjusts the supply of the $NH_4Cl$ powder 31 fed into the $NH_4Cl$ dissolving tank 37 by the feeder 35 and the supply of the water 39 fed into the $NH_4Cl$ dissolving tank 37 with the valve V1, based on the concentration value of the $NH_4Cl$ solution 14 measured by the $NH_4Cl$ concentration meter 41 and values of the NOx concentration and the Hg concentration in the flue gas 12. The flow rate of the $NH_4Cl$ solution 14 that flows through the $NH_4Cl$ solution feed pipe 44 can be adjusted with the valve V2, by the supply speed of the $NH_4Cl$ solution 14 based on the concentration of the adjusted $NH_4Cl$ solution 14. The supply flow rate of the $NH_3$ gas 16 and the HCl gas 17 can be adjusted in any proportion, based on the values of the concentration of the $NH_4Cl$ solution 14, and the NOx concentration and the Hg concentration in the flue gas 12.

Accordingly, while arbitrarily adjusting the concentration of the $NH_4Cl$ solution 14 based on the NOx concentration and the Hg concentration in the flue gas 12, the flow rate of the $NH_4Cl$ solution 14 is adjusted to an appropriate amount, and the supply flow rates of the $NH_3$ gas 16 and the HCl gas 17 are adjusted in any proportion. Consequently, the $NH_4Cl$ solution 14, the $NH_3$ gas 16, and the HCl gas 17 can be supplied into the flue 13.

In this manner, an appropriate amount of $NH_3$ and HCl can be arbitrarily supplied into the flue gas 12, corresponding to the concentrations of NOx and Hg in the flue gas 12 discharged from combustion equipment such as a boiler. Accordingly, the fluctuations of concentration distribution of the reducing agent and the mercury chlorinating agent can be reduced. Consequently, it is possible to evaporate $NH_4Cl$ without fail, thereby preventing powder from remaining and the like due to $NH_4Cl$.

Fourth Embodiment

Figure 12:
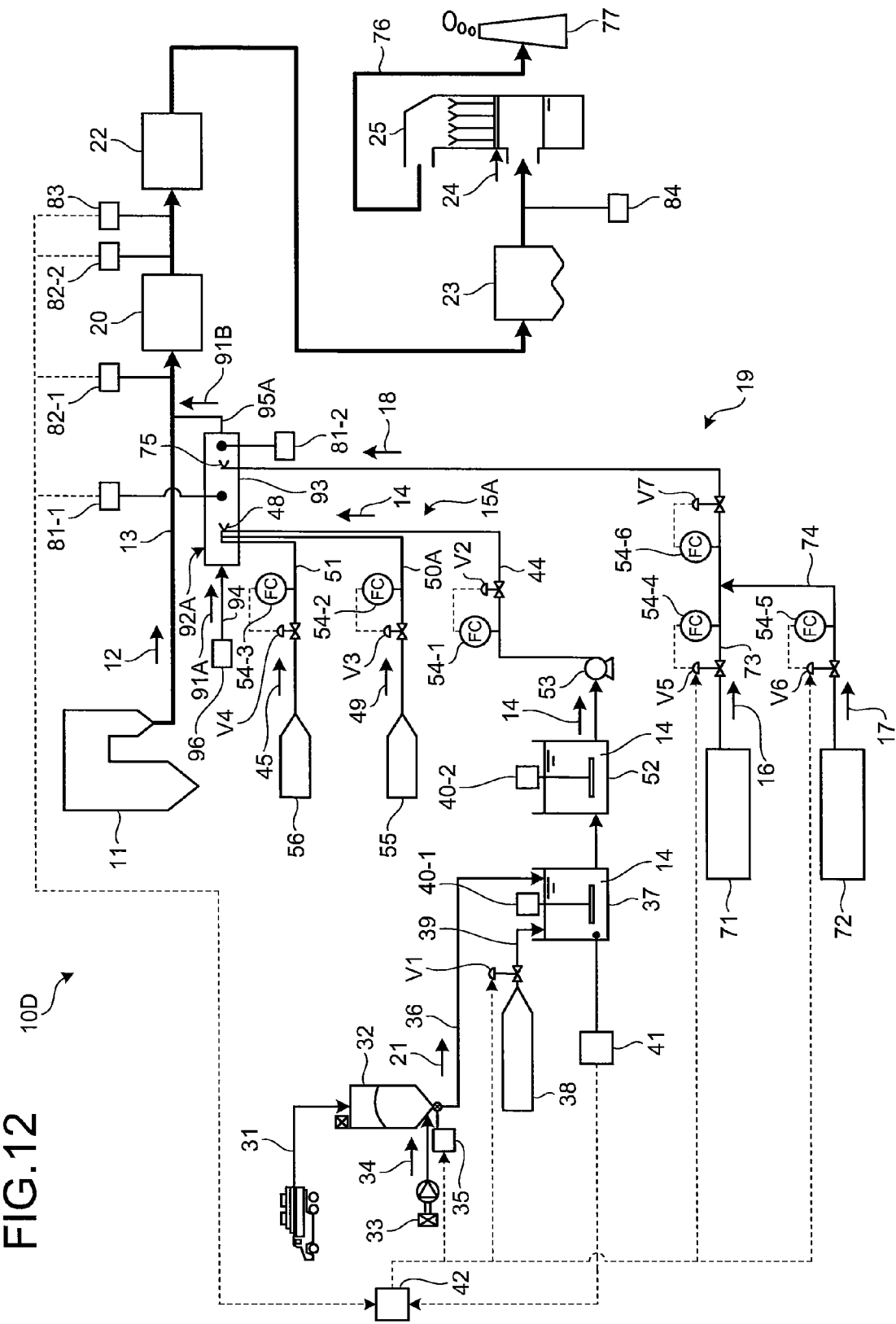
FIG. 12 is a schematic of a mercury reduction system according to a fourth embodiment of the present invention.
Figure 13:
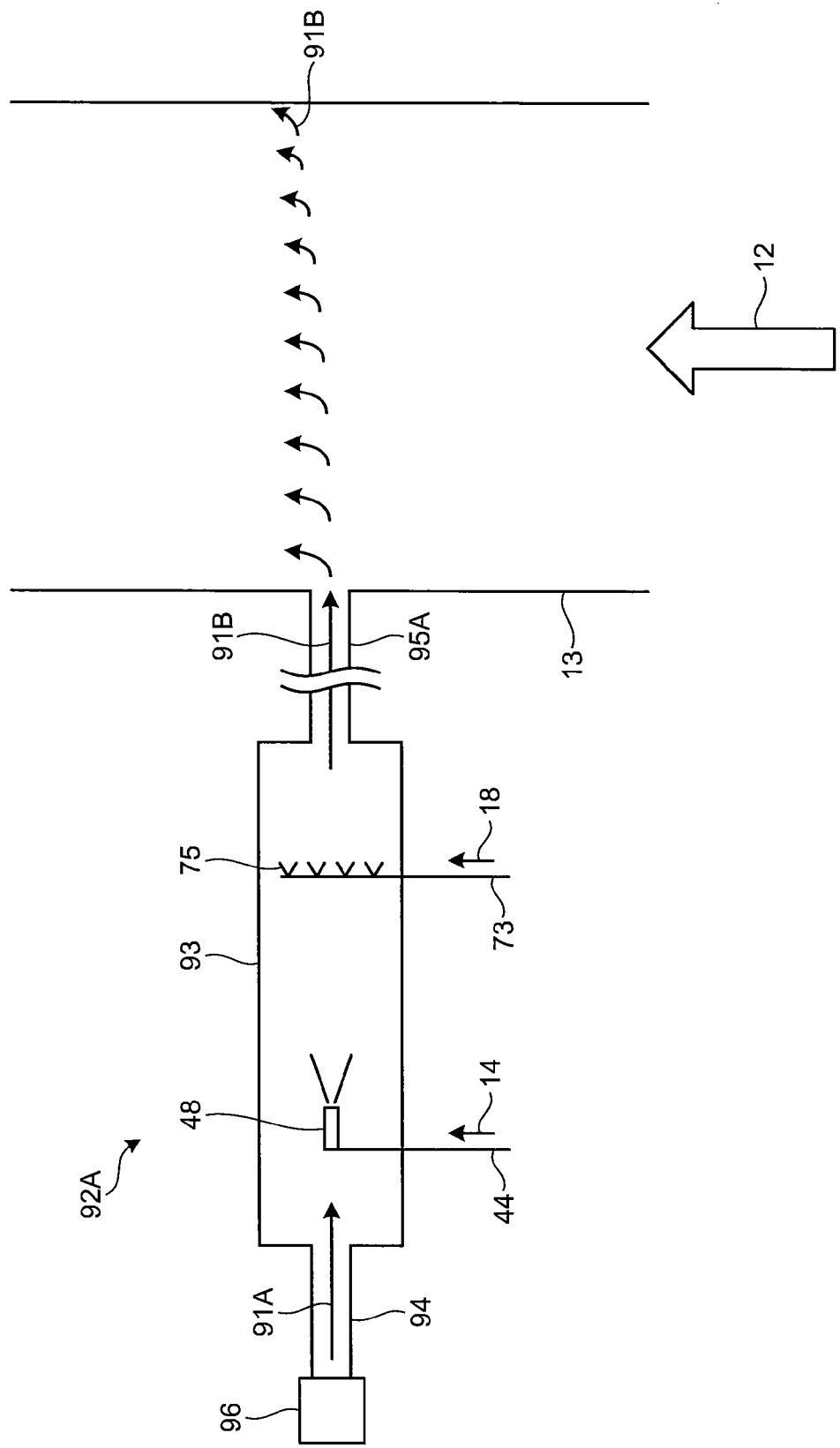
FIG. 13 is a schematic of a detailed structure of a part of FIG. 12.

A mercury reduction system according to a fourth embodiment will now be described with reference to the accompanying drawings. FIG. 12 is a schematic of the mercury reduction system according to the fourth embodiment of the present invention. FIG. 13 is a schematic of a detailed structure of a part of FIG. 12. The same members as those of the mercury reduction system according to the first to the third embodiments are denoted by the same reference numerals, and the detailed descriptions thereof will be omitted.

As shown in FIGS. 12 and 11, a mercury reduction system 10D according to the present embodiment does not directly supply the $NH_4Cl$ solution 14, the $NH_3$ gas 16, or the HCl gas 17 into the flue 13, but mixes the $NH_4Cl$ solution 14, the $NH_3$ gas 16, and the HCl gas 17 with high-temperature air 91A in any proportion in advance, and supplies into the flue 13.

As shown in FIGS. 12 and 11, the mercury reduction system 10D according to the present embodiment includes a vaporizer 92A that is placed upstream of the reduction denitration apparatus 20 and supplies the high-temperature air 91A containing $NH_3$ and HCl from the wall surface of the flue 13.

The vaporizer 92A includes a high-temperature air feed pipe 94 that introduces the high-temperature air 91A in an apparatus main body 93, the $NH_4Cl$ solution spraying unit 15A that sprays the $NH_4Cl$ solution 14 in the apparatus main body 93, the mixed gas spraying unit 19 that supplies the mixed gas 18 containing the $NH_3$ gas 16 and the HCl gas 17 in the apparatus main body 93, and a high-temperature air introduction pipe 95A that introduces high-temperature air 91B containing $NH_3$ gas and HCl gas in the apparatus main body 93 into the flue 13.

The concentrations of $NH_3$ and HCl in the high-temperature air 91B can be made into the concentrations of $NH_3$ and HCl arbitrarily pre-adjusted, by containing $NH_3$ gas and HCl gas generated by spraying and evaporating the $NH_4Cl$ solution 14, and the $NH_3$ gas 16 and the HCl gas 17 in the mixed gas 18, into the high-temperature air 91A supplied from a high-temperature air supplying unit 96 through the high-temperature air feed pipe 94.

A distance between the position of the two-fluid nozzle 48 that sprays the $NH_4Cl$ solution 14 and the position of the injection nozzle 75 that injects the mixed gas 18, is kept in a distance that $NH_4Cl$ will not be redeposited. This is because when the $NH_3$ gas 16 in the mixed gas 18 is injected, there is a possibility that $NH_4Cl$ may be deposited.

Accordingly, the high-temperature air 91B in which the concentrations of $NH_3$ and HCl are arbitrarily pre-adjusted, based on the NOx concentration and the Hg concentration in the flue gas 12, can be supplied into the flue 13 from the high-temperature air introduction pipe 95A. Consequently, appropriate amounts of $NH_3$ and HCl can be supplied into the flue 13, by corresponding to the concentrations of NOx and Hg in the flue gas 12 discharged from combustion equipment such as a boiler. As a result, NOx is reduced and Hg is oxidized in the flue gas 12, whereby NOx and Hg can be treated in the flue 13 without fail.

Fifth Embodiment

A mercury reduction system according to a fifth embodiment will now be described, with reference to the accompanying drawings.

The mercury reduction system according to the fifth embodiment of the present invention has the same configuration as the mercury reduction system according to the fourth embodiment. Accordingly, in the present embodiment, only a configuration of vaporizer that supplies liquid material and gaseous material in the mercury reduction system will be described with accompanying drawings.

Figure 14:
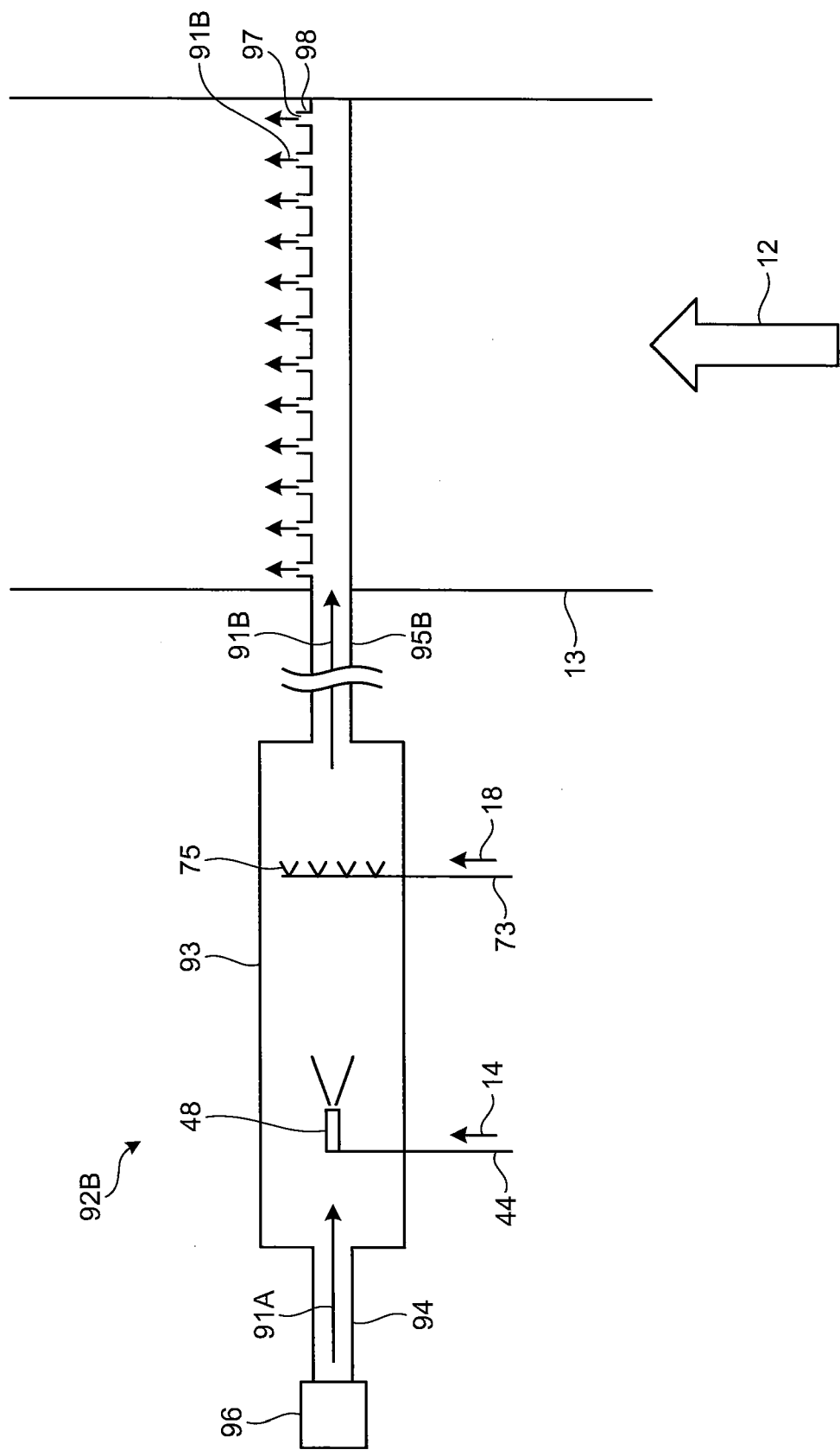
FIG. 14 is a schematic of a mercury reduction system according to a fifth embodiment of the present invention.
Figure 15:
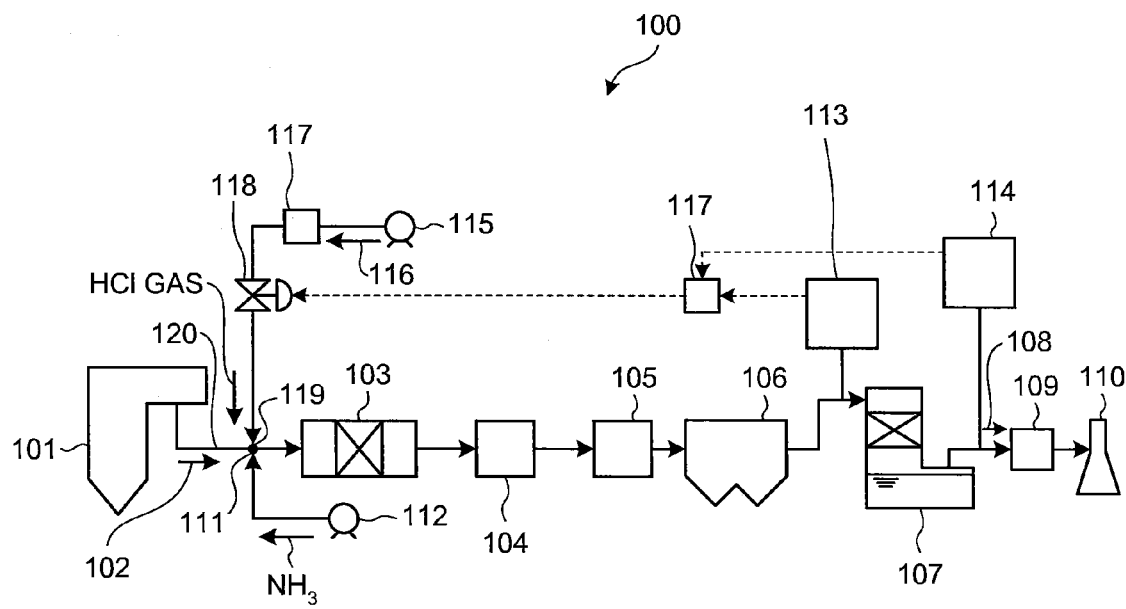
FIG. 15 is a schematic of a flue gas treatment system including a mercury reduction system.
Figure 16:
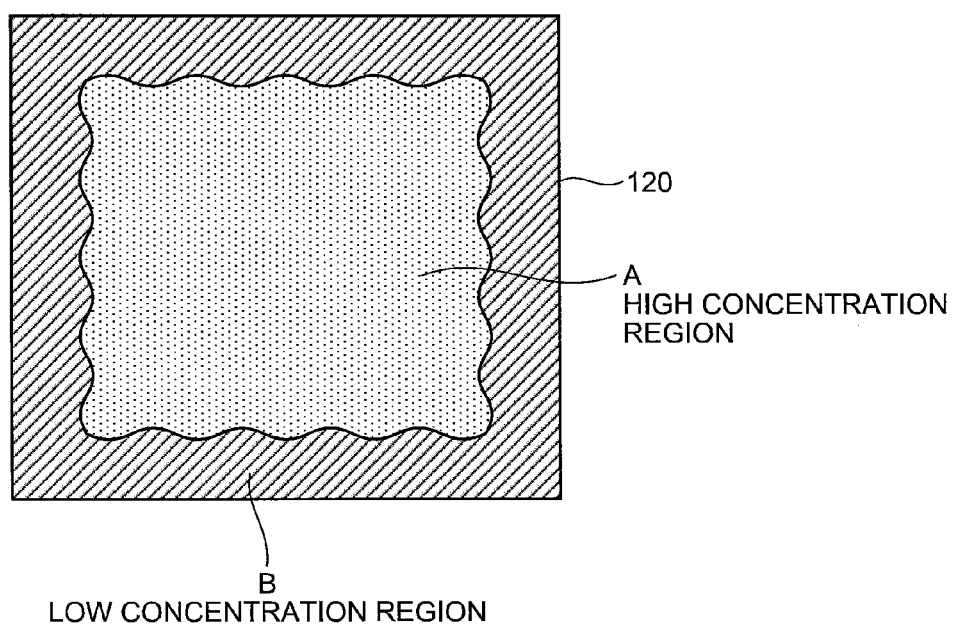
FIG. 16 is a simple schematic of concentration distribution in a duct.

FIG. 14 is a schematic of a vaporizer of the mercury reduction system according to the fifth embodiment of the present invention. The same members as those of the mercury reduction system according to the first to the fourth embodiments are denoted by the same reference numerals, and the detailed descriptions thereof will be omitted.

As shown in FIG. 14, a vaporizer 928 of the mercury reduction system according to the present embodiment has a configuration in which a high-temperature air introduction pipe 95B is inserted into the flue 13, and includes a plurality of short pipes 98 with holes 97 from which the high-temperature air 91B is blown out, at the downstream side of the flue gas 12 in the longitudinal direction of the high-temperature air introduction pipe 95B.

In other word, as shown in FIG. 14, the vaporizer 92B of the mercury reduction system according to the present embodiment includes the high-temperature air introduction pipe 95B inserted into the flue 13 and introduces the high-temperature air 91B in the apparatus main body 93 into the flue 13, and the short pipes 98 having holes 97 in the longitudinal direction of the high-temperature air introduction pipe 95B in the flue 13. The short pipes 98 are provided downstream of the flue gas 12, in the longitudinal direction of the high-temperature air introduction pipe 95B. Accordingly, the high-temperature air 91B can be accompanied with the flow of the flue gas 12, thereby effectively mixing $NH_3$ and HCl in the flue gas 12. The direction of the short pipes 98 on the high-temperature air introduction pipe 95B is not particularly limited, and the short pipes may be provided upstream of the flue gas 12 in the high-temperature air introduction pipe 95B.

Because the high-temperature air introduction pipe 95B is inserted into the flue 13, and the plurality of nozzle holes 97 are provided on the high-temperature air introduction pipe 95B in the flue 13, the high-temperature air 91B in which the concentrations of $NH_3$ and HCl are arbitrarily pre-adjusted can be uniformly sprayed to the flue gas 12. Accordingly, NOx is reduced and Hg is oxidized in the flue gas 12 further without fail. In addition, NOx and Hg in the flue 13 can be treated more effectively.

In this manner, the mercury reduction system and the mercury reduction method of flue gas containing mercury according to the present invention can simultaneously supply a reducing agent and a mercury chlorinating agent in any proportion to the flue gas with a simple device, based on the gaseous nature of the flue gas. Accordingly, it is possible to reduce the fluctuation of concentration distribution of the reducing agent and the mercury chlorinating agent in the flue, while maintaining the reduction performances of Hg and NOx in the flue gas.

With the present invention, a liquid material obtained by dissolving an oxidation-reduction agent that reduces nitrogen oxide in flue gas by a denitration catalyst and oxidizes mercury in the presence of hydrogen chloride with a solvent, is sprayed into the flue gas in a liquid state, a reducing agent and a mercury chlorinating agent are generated by evaporating the sprayed liquid material, and the reducing agent and the mercury chlorinating agent can be simultaneously supplied to the flue gas in any proportion based on the gaseous nature of the flue gas, by injecting at least one of the gaseous materials used as the reducing agent or the mercury chlorinating agent or both of them into a flue. Because the gaseous material is injected downstream of the liquid material, the fluctuation of concentration distribution of the reducing agent and the mercury chlorinating agent supplied into the flue can be reduced. Accordingly, it is possible to enhance oxidation and reduction of mercury and nitrogen oxide in the flue gas.

What is claimed is:

1. A mercury reduction system that reduces nitrogen oxide and mercury in flue gas discharged from a boiler, the mercury reduction system comprising:

a liquid material spraying unit that sprays a liquid material obtained by dissolving an oxidation-reduction agent reducing nitrogen oxide in the flue gas by a denitration catalyst and oxidizing mercury in a presence of hydrogen chloride, into a flue of the boiler in a liquid state;

a gaseous material spraying unit that is provided downstream of the liquid material spraying unit, and sprays at least one of a reducing agent reducing nitrogen oxide in the flue gas by the denitration catalyst and a mercury chlorinating agent oxidizing mercury in the flue gas in the presence of the hydrogen chloride by the denitration catalyst or both of them into the flue as a gaseous material;

a reduction denitration apparatus that includes the denitration catalyst reducing nitrogen oxide in the flue gas with ammonia, and oxidizing mercury in the presence of the hydrogen chloride; and a wet desulfurization apparatus that reduces mercury having been oxidized by the reduction denitration apparatus with an alkali absorbent.

2. The mercury reduction system according to claim 1, wherein the liquid material is a mixed solution obtained by mixing at least one of the reducing agent that reduces nitrogen oxide in the flue gas by the denitration catalyst and the mercury chlorinating agent that oxidizes mercury in the presence of the hydrogen chloride or both of them with the oxidation-reduction agent.

3. The mercury reduction system according to claim 1, wherein the oxidation-reduction agent is an ammonium halide.

4. The mercury reduction system according to claim 2, wherein the liquid material used as the reducing agent is at least one of ammonia and urea or both of them.

5. The mercury reduction system according to claim 2, wherein the liquid material used as the mercury chlorinating agent is a hydrogen halide.

6. The mercury reduction system according to claim 1, wherein
the liquid material spraying unit includes
an oxidation-reduction agent feed pipe through which the oxidation-reduction agent is supplied into the flue in a liquid state;
a blow pipe with an injection hole that is inserted into the flue so as to surround the oxidation-reduction agent feed pipe, and through which air supplied therein is injected into the flue; and
an injection nozzle that is fitted to an end of the oxidation-reduction agent feed pipe, and through which the oxidation-reduction agent is injected, and
the oxidation-reduction agent is sprayed into the flue accompanied with the air.

7. The mercury reduction system according to claim 6, wherein the injection nozzle is a two-fluid nozzle through which the oxidation-reduction agent and the air for spraying the oxidation-reduction agent are injected.

8. The mercury reduction system according to claim 1, wherein
the liquid material spraying unit includes
an oxidation-reduction agent feed pipe through which the oxidation-reduction agent is supplied into the flue in a liquid state,
an air feed pipe that is inserted into the flue so as to surround the oxidation-reduction agent feed pipe, and through which air for spraying the oxidation-reduction agent is supplied into the flue, and
a two-fluid nozzle that is fixed to an end of the oxidation-reduction agent feed pipe and of the air feed pipe, and through which the oxidation-reduction agent and the air are injected, and
the oxidation-reduction agent is sprayed into the flue accompanied with the air.

9. The mercury reduction system according to claim 1, further comprising a vaporizer that is provided outside of the flue, and supplies the liquid material sprayed from the liquid material spraying unit and the gaseous material injected from the gaseous material spraying unit to high-temperature air supplied into an apparatus main body, and supplies the high-temperature air containing the liquid material and the gaseous material into the flue.

10. The mercury reduction system according to claim 9, further comprising a high-temperature air introduction pipe that is inserted into the flue from the apparatus main body, and introduces the high-temperature air containing the liquid material and mixed gas in the apparatus main body into the flue, wherein
the high-temperature air introduction pipe has a plurality of short pipes with holes in a longitudinal direction thereof.

11. The mercury reduction system according to claim 1, wherein the gaseous material used as the reducing agent is ammonia.

12. The mercury reduction system according to claim 1, wherein the gaseous material used as the mercury chlorinating agent is a hydrogen halide.

13. The mercury reduction system according to claim 1, wherein temperature of the flue gas is equal to or more than 320° C. and equal to or less than 420° C.

14. The mercury reduction system according to claim 1, further comprising a nitrogen oxide concentration meter that is provided upstream and downstream of the reduction denitration apparatus, and measures concentration of nitrogen oxide in the flue gas.

15. A mercury reduction method of flue gas containing mercury for reducing nitrogen oxide and mercury in flue gas discharged from a boiler, the mercury reduction method of flue gas containing mercury comprising:
a step of liquid material spraying for spraying a liquid material obtained by dissolving an oxidation-reduction agent that reduces nitrogen oxide in the flue gas by a denitration catalyst and oxidizes mercury in a presence of hydrogen chloride with a solvent, into a flue of the boiler in a liquid state;
a step of gaseous material spraying for spraying at least one of a reducing agent that reduces nitrogen oxide in the flue gas by the denitration catalyst and a mercury chlorinating agent that oxidizes mercury in the flue gas in the presence of the hydrogen chloride by the denitration catalyst or both of them into the flue as a gaseous material;
a step of reduction denitration treating for reducing nitrogen oxide in the flue gas by the denitration catalyst with ammonia and oxidizing mercury in the presence of the hydrogen chloride; and
a step of wet desulfurizing for reducing mercury oxidized at the step of reduction denitration treating by with an alkali absorbent.

16. The mercury reduction method of flue gas containing mercury according to claim 15, wherein the liquid material is a mixed solution obtained by mixing at least one of the reducing agent that reduces nitrogen oxide in the flue gas by the denitration catalyst and the mercury chlorinating agent that oxidizes mercury in the presence of the hydrogen chloride or both of them with the oxidation-reduction agent.

17. The mercury reduction method of flue gas containing mercury according to claim 15, wherein the oxidation-reduction agent is an ammonium halide.

18. The mercury reduction method of flue gas containing mercury according to claim 16, wherein the liquid material used as the reducing agent is ammonia or urea.

19. The mercury reduction method of flue gas containing mercury according to claim 16, wherein the liquid material used as the mercury chlorinating agent is a hydrogen halide.

20. The mercury reduction method of flue gas containing mercury according to claim 15, wherein the liquid material is sprayed with a two-fluid nozzle at the step of liquid material spraying.

21. The mercury reduction method of flue gas containing mercury according to claim 15, wherein the gaseous material used as the reducing agent is ammonia.

22. The mercury reduction method of flue gas containing mercury according to claim 15, wherein the gaseous material used as the mercury chlorinating agent is a hydrogen halide.

* * * * *